(12) United States Patent
Liu et al.

(10) Patent No.: US 12,342,408 B2
(45) Date of Patent: Jun. 24, 2025

(54) DATA TRANSMISSION METHOD, RELATED DEVICE, AND SYSTEM

(71) Applicant: HUAWEI TECHNOLOGIES CO., LTD., Guangdong (CN)

(72) Inventors: Peng Liu, Shenzhen (CN); Guangjian Wang, Chengdu (CN); Jingjing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 17/375,745

(22) Filed: Jul. 14, 2021

(65) Prior Publication Data

US 2021/0345444 A1 Nov. 4, 2021

Related U.S. Application Data

(63) Continuation of application No. PCT/CN2020/071435, filed on Jan. 10, 2020.

(30) Foreign Application Priority Data

Jan. 16, 2019 (CN) .......................... 201910040281.6

(51) Int. Cl.
*H04W 76/28* (2018.01)
*H04W 36/00* (2009.01)
(Continued)

(52) U.S. Cl.
CPC ........ *H04W 76/28* (2018.02); *H04W 36/0011* (2013.01); *H04W 52/0216* (2013.01);
(Continued)

(58) Field of Classification Search
CPC ..................................................... H04W 76/28
See application file for complete search history.

(56) References Cited

U.S. PATENT DOCUMENTS 9,942,852 B2 4/2018 Hsu et al.
2015/0208353 A1 7/2015 Jung et al.
(Continued)

FOREIGN PATENT DOCUMENTS

CN 101675689 A 3/2010
CN 102111856 A 6/2011
(Continued)

OTHER PUBLICATIONS

Nokia, Nokia Shanghai Bell, "Preconfigured Grant for Uplink transmission," 3GPP TSG RAN WG1 Meeting #94, R1-1811074, Chengdu, China, Oct. 8-12, 2018, 6 pages.
(Continued)

*Primary Examiner* — Hsinchun Liao
(74) *Attorney, Agent, or Firm* — Fish & Richardson P.C.

(57) ABSTRACT

This application provides an example data transmission method, a related example device, and an example system. One example method may include receiving, by a terminal device, indication information sent by a network-side device, where the indication information is used to indicate a receiving time period, and the receiving time period is after a power saving mode (PSM) period. The method also includes obtaining, by the terminal device, a timing advance (TA) value in the receiving time period. The method also includes sending, by the terminal device, data to the network-side device based on the TA value.

20 Claims, 15 Drawing Sheets

(51) Int. Cl.
*H04W 52/02* (2009.01)
*H04W 64/00* (2009.01)
*H04W 68/00* (2009.01)

(52) U.S. Cl.
CPC .......... *H04W 64/00* (2013.01); *H04W 68/00* (2013.01); *H04W 36/0072* (2013.01)

(56) References Cited

U.S. PATENT DOCUMENTS

2017/0331670 A1  11/2017  Parkvall et al.
2019/0104470 A1*  4/2019  Johansson ............. H04W 72/23

FOREIGN PATENT DOCUMENTS

| CN | 104968036 A | 10/2015 |
| CN | 105578564 A | 5/2016 |
| CN | 106793057 A | 5/2017 |
| CN | 107295612 A | 10/2017 |
| CN | 107979849 A | 5/2018 |
| CN | 108271274 A | 7/2018 |
| CN | 108307495 A | 7/2018 |
| CN | 108337728 A | 7/2018 |
| WO | 2010126344 A2 | 11/2010 |
| WO | 2013027721 A1 | 2/2013 |
| WO | 2018032508 A1 | 2/2018 |
| WO | 2018070908 A1 | 4/2018 |
| WO | 2018099387 A1 | 6/2018 |
| WO | 2018144873 A1 | 8/2018 |

OTHER PUBLICATIONS

Office Action issued in Chinese Application No. 201910040281.6 on Jul. 5, 2021, 6 pages (with English translation).
Office Action issued in Chinese Application No. 201910040281.6 on Dec. 28, 2020, 16 pages (with English translation).
PCT International Search Report and Written Opinion issued in International Application No. PCT/CN2020/071435 on Apr. 8, 2020, 15 pages (with English translation).
Extended European Search Report issued in European Application No. 20741654.6 on Nov. 26, 2021, 11 pages.
Office Action in European Appln. No. 20741654.6, mailed on Nov. 15, 2024, 8 pages.

* cited by examiner

DATA TRANSMISSION METHOD, RELATED DEVICE, AND SYSTEM

CROSS-REFERENCE TO RELATED APPLICATIONS

This application is a continuation of International Application No. PCT/CN2020/071435, filed on Jan. 10, 2020, which claims priority to Chinese Patent Application No. 201910040281.6, filed on Jan. 16, 2019. The disclosures of the aforementioned applications are hereby incorporated by reference in their entireties.

TECHNICAL FIELD

This application relates to the communications field, and in particular, to a data transmission method, a related device, and a system.

BACKGROUND

During communication between a network-side device and a terminal device, an important feature of uplink transmission is that different terminal devices perform orthogonal multiple access in time and frequency, that is, uplink transmission of different terminal devices in one cell does not interfere with each other. To ensure orthogonality between different users that send uplink data at one moment, the network-side device requires that an error between times when data sent by different users arrives at the network-side device fall within a cyclic prefix (cyclic prefix, CP) range. Because distances between the users and the network-side device are different, transmit clocks of terminal devices need to be adjusted, so that a terminal device that is farther away sends data earlier, and a terminal device that is closer sends data later. This operation is referred to as uplink synchronization or timing alignment (timing alignment, TA). Specifically, the network-side device sends a TA value to each terminal device, and the terminal device determines, based on the received TA value, a starting moment for sending uplink data.

A terminal device has a long transmission interval and a small data volume in an internet of things service. Based on this case, a power saving mode (power saving mode, PSM) is introduced in the terminal device to reduce power consumption. In the power saving mode, when the terminal device does not send data, a transmitter/receiver in the terminal device is turned off, to reduce power consumption. However, information about the terminal device is still retained in a core network. When the terminal device needs to send data, the transmitter/receiver in the terminal device is turned on, and the terminal device may directly access a network by using the information about the terminal device that is stored in the core network.

Duration of the power saving mode may be tens of minutes to hundreds of days. In the communications system, because the network-side device moves or the terminal device moves, relative locations of the network-side device and the terminal device may have changed greatly after the power saving mode ends. After the power saving mode ends, if the terminal device sends data to the network-side device still based on the TA value used before the power saving mode ends, it cannot be ensured that the network-side device is in a receiving state when the sent data arrives at the network-side device. In other words, it cannot be ensured that the network-side device can properly receive the data.

SUMMARY

In view of this, a first aspect of the embodiments of this application provides a data transmission method. The method may include: A terminal device receives indication information sent by a network-side device, where the indication information is used to indicate a receiving time period, duration of the receiving time period may be determined by the network-side device according to a definition in new radio (NR)/long term evolution (LTE) or another standard, or may be preconfigured in a system, or may be agreed upon between the terminal device and the network-side device, and the receiving time period is after a power saving mode PSM period. The terminal device obtains a timing advance TA value in the receiving time period, where the TA value may be calculated by the terminal device, or may be calculated by the network-side device and sent by the network-side device to the terminal device. The terminal device sends data to the network-side device based on the TA value. In this method, the terminal device obtains the current TA value in the receiving time period after the PSM period, and then sends the data to the network-side device based on the current TA value, thereby ensuring that the network-side device is in a receiving state when the data is transmitted to the network-side device, so that the data can be properly received.

Optionally, with reference to the first aspect, in a first possible implementation of the first aspect, that the terminal device obtains a timing advance TA value in the receiving time period includes: The terminal device obtains the TA value in the receiving time period based on location information of the terminal device and/or location information of the network-side device. In the first possible implementation of the first aspect, the terminal device calculates the TA value instead of receiving the TA value from the network-side device, thereby reducing a quantity of interactions for sending and receiving information, and reducing resources occupied for sending information.

Optionally, with reference to the first possible implementation of the first aspect, in a second possible implementation of the first aspect, before the terminal device determines the TA value in the receiving time period based on the location information of the terminal device and/or the location information of the network-side device, the method may further include: The terminal device synchronizes downlink data in the receiving time period and obtains a downlink starting moment in the receiving time period. The terminal device demodulates a paging signal based on the downlink starting moment and obtains the location information of the network-side device, where the paging signal is received by the terminal device from the network-side device in the receiving time period. In the second possible implementation of the first aspect, the terminal device demodulates the paging signal to obtain the location information of the network-side device, so that the location information of the network-side device is more time-effective, and the location information of the network-side device is more accurate.

Optionally, with reference to the first possible implementation of the first aspect, in a third possible implementation of the first aspect, before the terminal device determines the TA value in the receiving time period based on the location information of the terminal device and/or the location information of the network-side device, the method may further include: The terminal device receives the location information of the network-side device that is sent by the network-side device. In the third possible implementation of the first aspect, the terminal device directly receives the location information of the network-side device from the network-side device, without performing extra calculation, thereby reducing operation steps of the terminal device.

Optionally, with reference to the first aspect, in a fourth possible implementation of the first aspect, that the terminal device obtains a timing advance TA value in the receiving time period includes: The terminal device receives the TA value sent by the network-side device. In the fourth possible implementation of the first aspect, the terminal device receives the TA value sent by the network-side device. Because the network-side device has a stronger calculation capability than the terminal device, calculating the TA value by the network-side device can reduce calculation load of the terminal device.

Optionally, with reference to any one of the first aspect to the fourth possible implementation of the first aspect, in a fifth possible implementation of the first aspect, before the terminal device receives the indication information sent by the network-side device, the method further includes: The terminal device receives handover indication information from a source network-side device, where the handover indication information is used to indicate the terminal device to hand over to the network-side device. In the fifth possible implementation of the first aspect, the terminal device can hand over to the network-side device based on the handover indication information, thereby avoiding a problem that the data sent by the terminal device cannot be properly received after the handover to the network-side device.

A second aspect of the embodiments of this application provides a data transmission method. The method may include: A network-side device sends indication information to a terminal device, where the indication information is used to indicate a receiving time period, the receiving time period is after a power saving mode PSM period, and duration of the receiving time period may be determined by the network-side device according to a definition in NR/LTE or another standard, or may be preconfigured in a system, or may be agreed upon between the terminal device and the network-side device. The network-side device receives data from the terminal device. In the method provided in the second aspect, after obtaining a TA value in the receiving time period, the terminal device sends the data to the network-side device based on the TA value, thereby ensuring that the network-side device is in a receiving state when the data is transmitted to the network-side device, so that the data can be properly received.

Optionally, with reference to the second aspect, in a first possible implementation of the second aspect, after the network-side device sends the indication information to the terminal device, the method may further include: The network-side device sends a paging signal to the terminal device, where the paging signal is used by the terminal device to obtain location information of the network-side device, and the location information of the network-side device is used by the terminal device to obtain the timing advance TA value. In the first possible implementation of the second aspect, the network-side device sends the paging signal to the terminal device, and the terminal device may demodulate the paging signal to obtain the location information of the network-side device. The location information of the network-side device that is obtained by the terminal device in this manner is relatively time-effective, and the location information is relatively accurate.

Optionally, with reference to the second aspect, in a second possible implementation of the second aspect, after the network-side device sends the indication information to the terminal device, the method may further include: The network-side device sends the location information of the network-side device to the terminal device, where the location information of the network-side device is used by the terminal device to obtain the timing advance TA value. In the second possible implementation of the second aspect, the network-side device directly sends the location information of the network-side device to the terminal device, so that the terminal device does not perform extra calculation, and operation steps of the terminal device are reduced.

Optionally, with reference to the second aspect, in a third possible implementation of the second aspect, after the network-side device sends the indication information to the terminal device, the method may further include: The network-side device obtains the TA value based on location information of the terminal device and/or the location information of the network-side device. The network-side device sends the TA value to the terminal device. In the third possible implementation of the second aspect, after obtaining the TA value, the network-side device sends the TA value to the terminal device. Because the network-side device has a stronger calculation capability than the terminal device, calculating the TA value by the network-side device can reduce calculation load of the terminal device.

Optionally, with reference to the third possible implementation of the second aspect, in a fourth possible implementation of the second aspect, before the network-side device obtains the TA value based on the location information of the terminal device and/or the location information of the network-side device, the method may further include: The network-side device determines the location information of the terminal device based on a previous TA value. In the fourth possible implementation of the second aspect, the network-side device may determine the location information of the terminal device based on the previous TA value, to ensure accuracy of a location of the terminal device.

Optionally, with reference to the third possible implementation of the second aspect, in a fifth possible implementation of the second aspect, before the network-side device obtains the TA value based on the location information of the terminal device and/or the location information of the network-side device, the method may further include: The network-side device reads the location information of the terminal device from a cache. In the fifth possible implementation of the second aspect, the network-side device directly reads the location information of the terminal device from the cache, so that steps of obtaining the location information of the terminal device are more concise, and a calculation process of the network-side device is simplified.

Optionally, with reference to any one of the second aspect to the fifth possible implementation of the second aspect, in a sixth possible implementation of the second aspect, before the network-side device sends the indication information to the terminal device, the method may further include: The network-side device receives information about the terminal device from a source network-side device, where the information about the terminal device is used to indicate the network-side device to send the indication information to the terminal device. In the sixth possible implementation of the second aspect, the network-side device may receive the information about the terminal device from the source network-side device, so that the network-side device may send the indication information to the terminal device based on the information about the terminal device, and the network-side device receives the data from the terminal device after the PSM period. In this way, a problem that the data sent by the terminal device cannot be properly received after handover to the network-side device can be avoided.

A third aspect of the embodiments of this application provides a terminal device. The terminal device may include: a receiving unit, configured to receive indication information sent by a network-side device, where the indication information is used to indicate a receiving time period, and the receiving time period is after a power saving mode PSM period; an obtaining unit, configured to obtain a timing advance TA value in the receiving time period; and a sending unit, configured to send data to the network-side device based on the TA value obtained by the obtaining unit. The terminal device obtains the current TA value in the receiving time period after the PSM period, and then sends the data to the network-side device based on the current TA value, thereby ensuring that the network-side device is in a receiving state when the data is transmitted to the network-side device, so that it can be ensured that the data can be properly received.

Optionally, with reference to the third aspect, in a first possible implementation of the third aspect, the obtaining unit may include: an obtaining subunit, configured to obtain the TA value in the receiving time period based on location information of the terminal device and/or location information of the network-side device.

Optionally, with reference to the first possible implementation of the third aspect, in a second possible implementation of the third aspect, the terminal device may further include: a synchronization unit, configured to: before the obtaining subunit determines the TA value in the receiving time period based on the location information of the terminal device and/or the location information of the network-side device, synchronize downlink data in the receiving time period and obtain a downlink starting moment in the receiving time period: and a demodulation unit, configured to demodulate a paging signal based on the downlink starting moment and obtain the location information of the network-side device, where the paging signal is received by the receiving unit from the network-side device in the receiving time period.

Optionally, with reference to the first possible implementation of the third aspect, in a third possible implementation of the third aspect, the terminal device may further include the receiving unit, further configured to: before the obtaining subunit determines the TA value in the receiving time period based on the location information of the terminal device and/or the location information of the network-side device, receive the location information of the network-side device that is sent by the network-side device.

Optionally, with reference to the third aspect, in a fourth possible implementation of the third aspect, the terminal device may further include the receiving unit, further configured to: before receiving the indication information sent by the network-side device, receive the TA value sent by the network-side device; and the obtaining unit obtains the TA value from the receiving unit.

Optionally, with reference to any one of the third aspect to the fourth possible implementation of the third aspect, in a fifth possible implementation of the third aspect, the terminal device may include the receiving unit, further configured to: before receiving the indication information sent by the network-side device, receive handover indication information sent by a source network-side device, where the handover indication information is used to indicate the terminal device to hand over to the network-side device.

A fourth aspect of this application provides a network-side device. The network-side device may include: a sending unit, configured to send indication information to a terminal device, where the indication information is used to indicate a receiving time period, and the receiving time period is after a power saving mode PSM period: and a receiving unit, configured to receive data from the terminal device. The network-side device may send the indication information to the terminal device. After obtaining a TA value in the receiving time period, the terminal device sends the data to the network-side device based on the TA value, thereby ensuring that the network-side device is in a receiving state when the data is transmitted to the network-side device, so that the data can be properly received.

Optionally, with reference to the fourth aspect, in a first possible implementation of the fourth aspect, the network-side device may include the sending unit, further configured to: after sending the indication information to the terminal device, send a paging signal to the terminal device, where the paging signal is used by the terminal device to obtain location information of the network-side device, and the location information of the network-side device is used by the terminal device to obtain the timing advance TA value.

Optionally, with reference to the fourth aspect, in a second possible implementation of the fourth aspect, the network-side device may include the sending unit, further configured to: after sending the indication information to the terminal device, send the location information of the network-side device to the terminal device, where the location information of the network-side device is used by the terminal device to obtain the timing advance TA value.

Optionally, with reference to the fourth aspect, in a third possible implementation of the fourth aspect, the network-side device may further include an obtaining unit, configured to obtain the TA value based on location information of the terminal device and/or the location information of the network-side device, and the sending unit is further configured to send the TA value to the terminal device.

Optionally, with reference to the third possible implementation of the fourth aspect, in a fourth possible implementation of the fourth aspect, the network-side device may further include a determining unit, configured to determine the location information of the terminal device based on a previous TA value.

Optionally, with reference to the third possible implementation of the fourth aspect, in a fifth possible implementation of the fourth aspect, the network-side device may further include a reading unit, configured to read the location information of the terminal device from a cache.

Optionally, with reference to the fourth aspect to the fifth possible implementation of the fourth aspect, in a sixth possible implementation of the fourth aspect, the network-side device may further include the receiving unit, further configured to: before the sending unit sends the indication information to the terminal device, receive information about the terminal device from a source network-side device, where the information about the terminal device is used to indicate the network-side device to send the indication information to the terminal device.

A fifth aspect of this application provides a system. The system includes the foregoing terminal device and network-side device.

A sixth aspect of this application provides a computer-readable storage medium, configured to store a computer program. The computer program includes an instruction used to perform the method in any one of the first aspect or the possible implementations of the first aspect.

A seventh aspect of this application provides a computer-readable storage medium, configured to store a computer program. The computer program includes an instruction used to perform the method in any one of the second aspect or the possible implementations of the second aspect.

An eighth aspect of this application provides a computer program product. The computer program product includes computer program code. When the computer program code is run on a computer, the computer is enabled to perform the method in any one of the first aspect or the possible implementations of the first aspect.

A ninth aspect of this application provides a computer program product. The computer program product includes computer program code. When the computer program code is run on a computer, the computer is enabled to perform the method in any one of the second aspect or the possible implementations of the second aspect.

A tenth aspect of this application provides an apparatus. The apparatus is configured to perform the method in any one of the first aspect or the possible implementations of the first aspect.

An eleventh aspect of this application provides an apparatus. The apparatus is configured to perform the method in any one of the second aspect or the possible implementations of the second aspect.

A twelfth aspect of this application provides an apparatus. The apparatus may include a processor, a memory, and a transceiver. The memory is configured to store a computer program. The processor is configured to execute the computer instruction stored in the memory, so that the apparatus performs the method in any one of the first aspect or the possible implementations of the first aspect.

A thirteenth aspect of this application provides an apparatus. The apparatus may include a processor, a memory, and a transceiver. The memory is configured to store a computer program. The processor is configured to execute the computer instruction stored in the memory, so that the apparatus performs the method in any one of the second aspect or the possible implementations of the second aspect.

A fourteenth aspect of this application provides a processor. The processor includes at least one circuit, configured to perform the method in any one of the first aspect or the possible implementations of the first aspect.

A fifteenth aspect of this application provides a processor. The processor includes at least one circuit, configured to perform the method in any one of the second aspect or the possible implementations of the second aspect.

The embodiments of this application provide a data transmission method, a related device, an apparatus, and a system. The method may include: A terminal device receives indication information sent by a network-side device, where the indication information is used to indicate a receiving time period, and the receiving time period is after a power saving mode PSM period. The terminal device obtains a timing advance TA value in the receiving time period. The terminal device sends data to the network-side device based on the TA value, and the network-side device receives the data from the terminal device. The terminal device sends the data to the network-side device based on the TA value obtained in the receiving time period, thereby ensuring that the network-side device is in a receiving state when the data arrives at the network-side device, and the network-side device can receive the data. It may be understood that the network device, the terminal device, a chip, and the like may each be referred to as an apparatus.

DESCRIPTION OF EMBODIMENTS

All other embodiments obtained by persons skilled in the art based on the embodiments of this application without creative efforts shall fall within the protection scope of this application.

In the specification, claims, and the accompanying drawings of this application, the terms "first", "second", and so on are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include", "comprise" and any other variants are intended to cover non-exclusive inclusion. For example, a process, method, system, product, or device that includes a list of steps or modules is not necessarily limited to those steps or modules clearly listed, but may include other steps or modules that are not clearly listed or that are inherent to such a process, method, system, product, or device.

The term "and/or" in this application may describe an association relationship for describing associated objects and represents that three relationships may exist. For example, A and/or B may represent the following three cases: Only A exists, both A and B exist, and only B exists. In addition, the character "/" in this application generally indicates an "or" relationship between associated objects.

A terminal device has a long transmission interval and a small data volume in an internet of things service. Based on this case, a power saving mode is introduced in the terminal device to reduce power consumption. Duration of the power saving mode may be tens of minutes to hundreds of days. In the communications system, because a network-side device moves or the terminal device moves, relative locations of the network-side device and the terminal device may have changed greatly after the power saving mode ends. After the power saving mode ends, if the terminal device sends data to the network-side device still based on a TA value used before the power saving mode starts, it cannot be ensured that the network-side device is in a receiving state when the sent data arrives at the network-side device, in other words, it cannot be ensured that the network-side device can properly receive the data. In this application, the network-side device may be a satellite base station, or may be another network device. This is not specifically limited.

Figure 1:
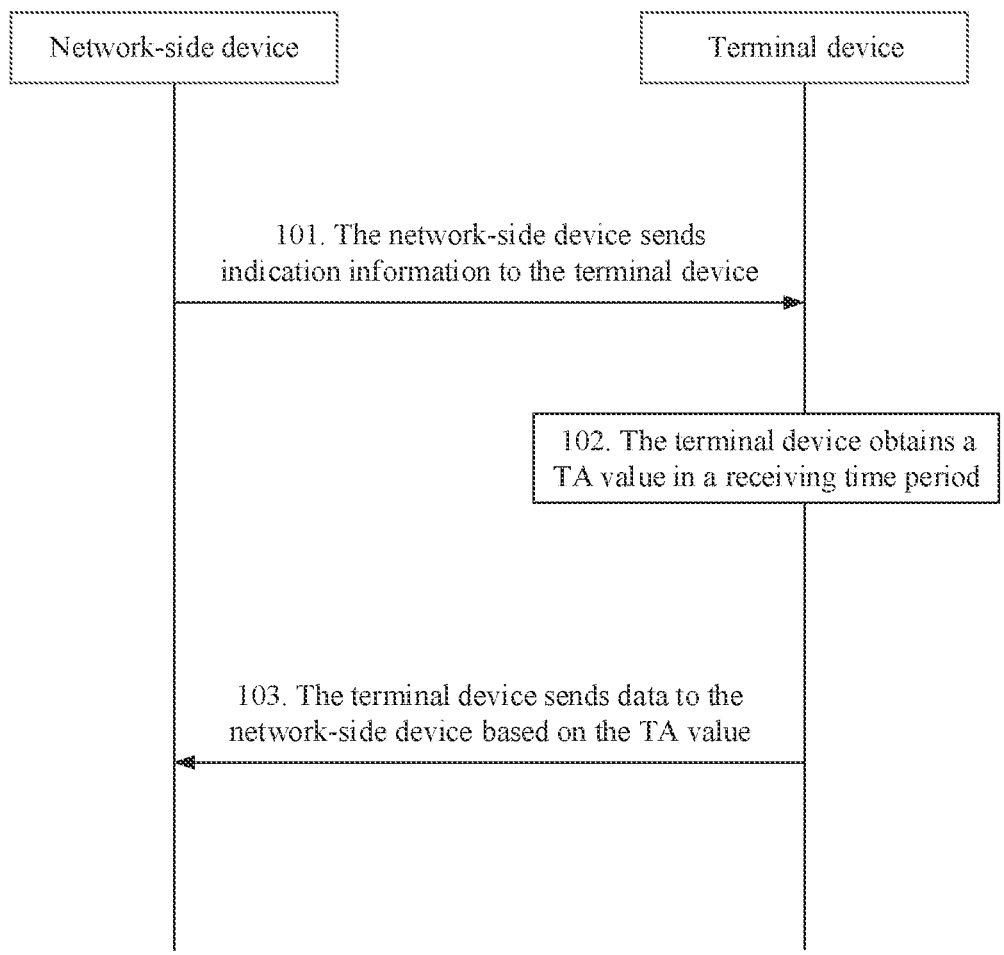
FIG. 1 is a schematic diagram of an embodiment of a data transmission method according to an embodiment of this application.

In view of this, this application provides a data transmission method. As shown in FIG. 1, a first embodiment may include the following steps.

101. A network-side device sends indication information to a terminal device.

The network-side device sends the indication information to the terminal device. The indication information is used to indicate a receiving time period. The receiving time period is after a PSM period. Duration of the receiving time period may be determined by the network-side device according to a definition in NR/LTE or another standard, or may be preconfigured in a system, or may be agreed upon between the terminal device and the network-side device. A specific manner of determining the duration of the receiving time period is not limited herein. When the duration of the receiving time period is agreed upon between the terminal device and the network-side device, specifically, the terminal device may send a reference value to the network-side device, and the network-side device may determine the duration of the receiving time period based on the reference value and an overall service status in a communications system including the network-side device and the terminal device. The duration of the receiving time period may be tens of seconds to tens of minutes. There may be further a system synchronization period before the PSM period. In the system synchronization period, the terminal device may receive pilot information sent by the network-side device. The pilot information is used to ensure time synchronization of the communications system. The terminal device may be an internet of things device, and the network-side device may be a satellite base station.

102. The terminal device obtains a TA value in the receiving time period.

The terminal device determines the receiving time period based on the indication information received from the network-side device in step 101, and the terminal device obtains the TA value in the receiving time period. The TA value may be calculated by the terminal device, or may be calculated by the network-side device and sent by the network-side device to the terminal device. Before the TA value is calculated, a distance difference between the network-side device and the terminal device needs to be obtained. The distance difference may be determined based on absolute locations of the network-side device and the terminal device, or is determined based on relative locations of the network-side device and the terminal device based on a reference point, or may be determined based on a relative location of the network-side device based on the terminal device or a relative location of the terminal device based on the network-side device. If the distance difference between the network-side device and the terminal device is determined based on the absolute locations, the absolute locations may be represented by longitudes and latitudes or by absolute locations in another reference system.

The calculation may be performed in the following manner: A distance between the network-side device and the terminal device is first calculated based on location information of the terminal device and location information of the network-side device. The distance between the network-side device and the terminal device is divided by a propagation speed of a transmit signal in a medium to obtain a transmission delay of transmitting the transmit signal between the network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The network-side device is in a receiving state in an $N^{th}$ timeslot after the terminal device sends data. The terminal device may obtain uplink and downlink information of the network-side device based on a broadcast channel of the network-side device, and further obtain the value of N.

Based on the foregoing formula for calculating the TA value, the transmission delay may also be derived based on a previous TA value, to obtain a distance between the network-side device and the terminal device at a moment when a TA value is calculated last time. Then a distance between the network-side device and the terminal device at a current moment is obtained based on a motion trajectory of the network-side device. A current TA value is calculated based on the distance between the network-side device and the terminal device at the current moment. The manner of calculating the current TA value based on the previous TA value may be performed on the terminal device, or may be performed on the network-side device. This is not limited herein. When the manner of calculating the current TA value based on the previous TA value is performed on the terminal device, the terminal device needs to receive the motion trajectory of the network-side device.

103. The terminal device sends data to the network-side device based on the TA value.

The terminal device determines, based on the TA value obtained in step 102, a starting moment for sending the data, and the terminal device sends the data to the network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the current TA value is obtained in the receiving time period after the PSM period. After the receiving time period, the terminal device determines, based on the current TA value, a starting time for sending the data to the network-side device, thereby ensuring that the network-side device is in a receiving state when the data is transmitted to the network-side device, so that the data can be properly received.

In the first embodiment, a manner of obtaining the TA value by the terminal device in the receiving time period may be as follows: The terminal device calculates the TA value; or the network-side device calculates the TA value, and then the terminal device receives the TA value from the network-side device. A second embodiment specifically describes the case in which the terminal device calculates the TA value in the receiving time period.

Figure 2:
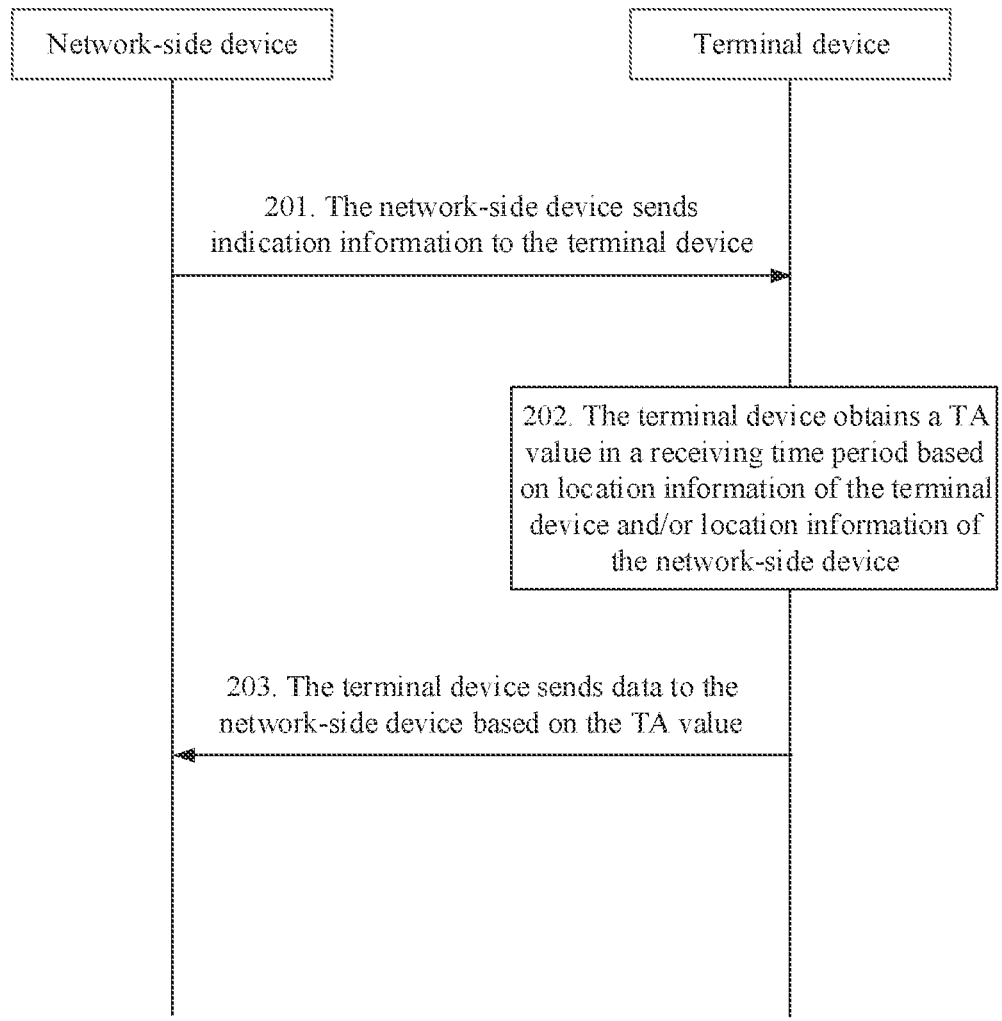
FIG. 2 is a schematic diagram of another embodiment of a data transmission method according to an embodiment of this application.

As shown in FIG. 2, the second embodiment provides a data transmission method. In the method, a terminal device obtains a TA value in a receiving time period based on location information of the terminal device and/or location information of a network-side device. The method may include the following steps.

201. The network-side device sends indication information to the terminal device.

The network-side device sends the indication information to the terminal device. The indication information is used to indicate the receiving time period. The receiving time period is after a PSM period. Duration of the receiving time period may be determined by the network-side device according to a definition in NR/LTE or another standard, or may be preconfigured in a system, or may be agreed upon between the terminal device and the network-side device. A specific manner of determining the duration of the receiving time period is not limited herein. When the duration of the receiving time period is agreed upon between the terminal device and the network-side device, specifically, the terminal device may send a reference value to the network-side device, and the network-side device may determine the duration of the receiving time period based on the reference value and an overall service status in a communications system including the network-side device and the terminal device. The duration of the receiving time period may be tens of seconds to tens of minutes. There may be further a system synchronization period before the PSM period. In the system synchronization period, the terminal device may receive pilot information sent by the network-side device. The pilot information is used to ensure time synchronization of the communications system. The terminal device may be an internet of things device, and the network-side device may be a satellite base station.

202. The terminal device obtains the TA value in the receiving time period based on the location information of the terminal device and/or the location information of the network side.

The terminal device determines the receiving time period based on the indication information received from the network-side device in step 201, and the terminal device obtains the TA value in the receiving time period. The TA value may be calculated by the terminal device. Before calculating the TA value, the terminal device needs to obtain a distance difference between the network-side device and the terminal device. The distance difference may be determined based on absolute locations of the network-side device and the terminal device, or is determined based on relative locations of the network-side device and the terminal device based on a reference point, or may be determined based on a relative location of the network-side device based on the terminal device or a relative location of the terminal device based on the network-side device. If the distance difference is determined based on the absolute locations of the network-side device and the terminal device, the absolute locations may be represented by longitudes and latitudes or by absolute locations in another reference system.

The calculation may be performed in the following manner. A distance between the network-side device and the terminal device is first calculated based on the location information of the terminal device and the location information of the network-side device. The distance between the network-side device and the terminal device is divided by a propagation speed of a transmit signal in a medium to obtain a transmission delay of transmitting the transmit signal between the network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The network-side device is in a receiving state in the $N^{th}$ timeslot after the terminal device sends data. The terminal device may obtain uplink and downlink information of the network-side device based on a broadcast channel of the network-side device, and further obtain the value of N.

203. The terminal device sends data to the network-side device based on the TA value.

The terminal device determines, based on the TA value obtained in step 202, a starting moment for sending the data, and the terminal device sends the data to the network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the terminal device obtains the TA value in the receiving time period after the PSM period based on the location information of the terminal device and/or the location information of the network-side device. The terminal device calculates the TA value instead of receiving the TA value from the network-side device, thereby reducing a quantity of interactions for sending and receiving information, and reducing resources occupied for sending information. In addition, it can be ensured that the network-side device is in a receiving state when the data is transmitted to the network-side device, so that the data can be properly received by the network-side device.

The second embodiment describes the case in which the terminal device obtains the TA value in the receiving time period based on the location information of the terminal device and/or the location information of the network-side device. Based on this case, the terminal device may obtain the location information of the network-side device by using a plurality of methods. A third embodiment provides a method: A terminal device may synchronize downlink data in a receiving time period and obtain a starting moment of the downlink data in the receiving time period, and demodulate a paging signal based on the starting moment to obtain location information of a network-side device.

Figure 3:
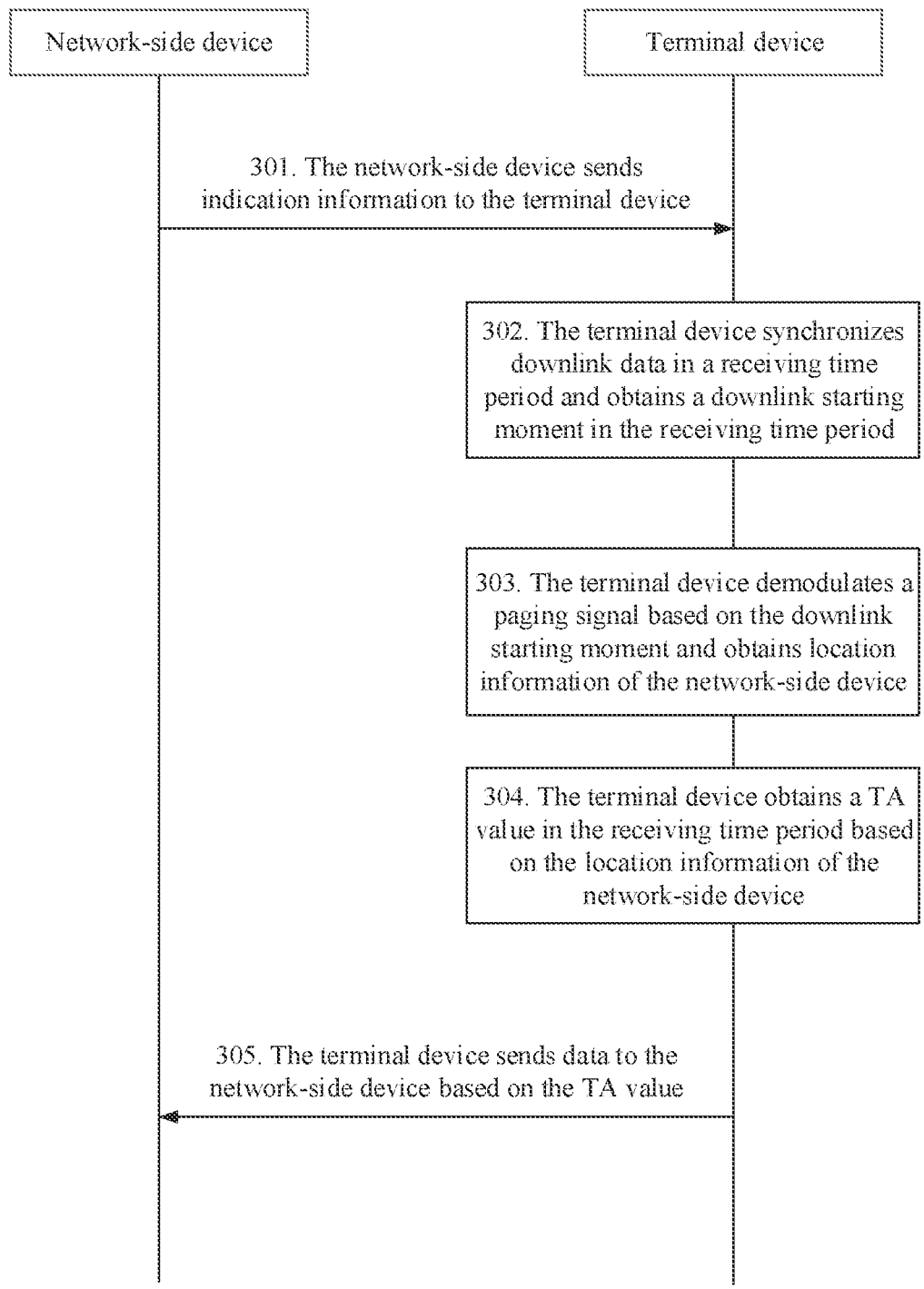
FIG. 3 is a schematic diagram of another embodiment of a data transmission method according to an embodiment of this application.

As shown in FIG. 3, the third embodiment provides a data transmission method. The method may include the following steps.

301. A network-side device sends indication information to a terminal device.

The network-side device sends the indication information to the terminal device. The indication information is used to indicate a receiving time period. The receiving time period is after a PSM period. Duration of the receiving time period may be determined by the network-side device according to a definition in NR/LTE or another standard, or may be preconfigured in a system, or may be agreed upon between the terminal device and the network-side device. A specific manner of determining the duration of the receiving time period is not limited herein. When the duration of the receiving time period is agreed upon between the terminal device and the network-side device, specifically, the terminal device may send a reference value to the network-side device, and the network-side device may determine the duration of the receiving time period based on the reference value and an overall service status in a communications system including the network-side device and the terminal device. The duration of the receiving time period may be tens of seconds to tens of minutes. There may be further a system synchronization period before the PSM period. In the system synchronization period, the terminal device may receive pilot information sent by the network-side device. The pilot information is used to ensure time synchronization of the communications system. The terminal device may be an internet of things device, and the network-side device may be a satellite base station.

302. The terminal device synchronizes downlink data in the receiving time period and obtains a downlink starting moment in the receiving time period.

The terminal device determines the receiving time period based on the indication information received from the network-side device in step 301, and synchronizes the downlink data in the receiving time period and obtains the downlink starting moment in the receiving time period. The downlink starting moment may be a starting moment of a downlink frame. When a communications system including the network-side device and the terminal device is a time division duplex (time division duplex, TDD) system, an uplink-downlink correspondence further needs to be obtained for synchronizing the downlink data.

303. The terminal device demodulates a paging signal based on the downlink starting moment and obtains location information of the network-side device.

The terminal device demodulates the paging signal based on the downlink starting moment obtained in step 302, to obtain the location information of the network-side device. The paging signal is received by the terminal device from the network side in the receiving time period. The terminal device may demodulate the paging signal to obtain the location information of the network-side device. The location information of the network-side device may be information about a relative location relative to a reference point, or may be information about an absolute location. The reference point may be a location of the terminal device or another location. This is not limited herein. The absolute location may be represented by a longitude and a latitude or by an absolute location in another reference system.

304. The terminal device obtains a TA value in the receiving time period based on the location information of the network-side device.

The terminal device obtains the TA value based on the location information of the network-side device that is obtained in step 303. The location information of the network-side device may be information about a location relative to a reference point, or may be information about an absolute location. The reference point may be a location of the terminal device or another location. This is not limited herein.

If a location of the network-side device is a relative location based on the terminal device, the terminal device may directly obtain a distance between the network-side device and the terminal device based on the location of the network-side device. If a location of the network-side device is a location based on another reference point or an absolute location, the terminal device obtains a distance between the network-side device and the terminal device based on the location of the network-side device and the location of the terminal device.

The terminal device divides the distance between the network-side device and the terminal device by a propagation speed of a transmit signal in a medium to obtain a transmission delay of transmitting the transmit signal between the network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The network-side device is in a receiving state in the $N^{th}$ timeslot after the terminal device sends data. The terminal device may obtain uplink and downlink information of the network-side device based on a broadcast channel of the network-side device, and further obtain the value of N.

305. The terminal device sends data to the network-side device based on the TA value.

The terminal device determines, based on the TA value obtained in the receiving time period in step 304, a starting moment for sending the data, and the terminal device sends the data to the network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the terminal device synchronizes the downlink data in the receiving time period after the PSM period and obtains the downlink starting moment in the receiving time period, and demodulates the paging signal based on the downlink starting moment to obtain the location information of the network-side device. The terminal device obtains the TA value based on the obtained location information of the network-side device. Then the terminal device determines, based on the TA value obtained in the receiving time period, a starting time for sending the data to the network-side device. The demodulating, by the terminal device, the paging signal to obtain the location information of the network-side device is more time-effective, and the location information of the network-side device is more accurate. In addition, it can be ensured that the network-side device is in a receiving state when the data is transmitted to the network-side device, so that the data can be properly received by the network-side device.

The second embodiment describes the case in which the terminal device obtains the TA value in the receiving time period based on the location information of the terminal device and/or the location information of the network-side device. Based on this case, the terminal device may obtain the location information of the network-side device in a plurality of manners. The third embodiment provides a method: A terminal device may synchronize downlink data in a receiving time period and obtain a starting moment of the downlink data in the receiving time period, and demodulate a paging signal based on the starting moment to obtain location information of a network-side device. A fourth embodiment provides another method; A network-side device sends location information of the network-side device to a terminal device, and the terminal device receives the location information of the network-side device in a receiving time period.

Figure 4:
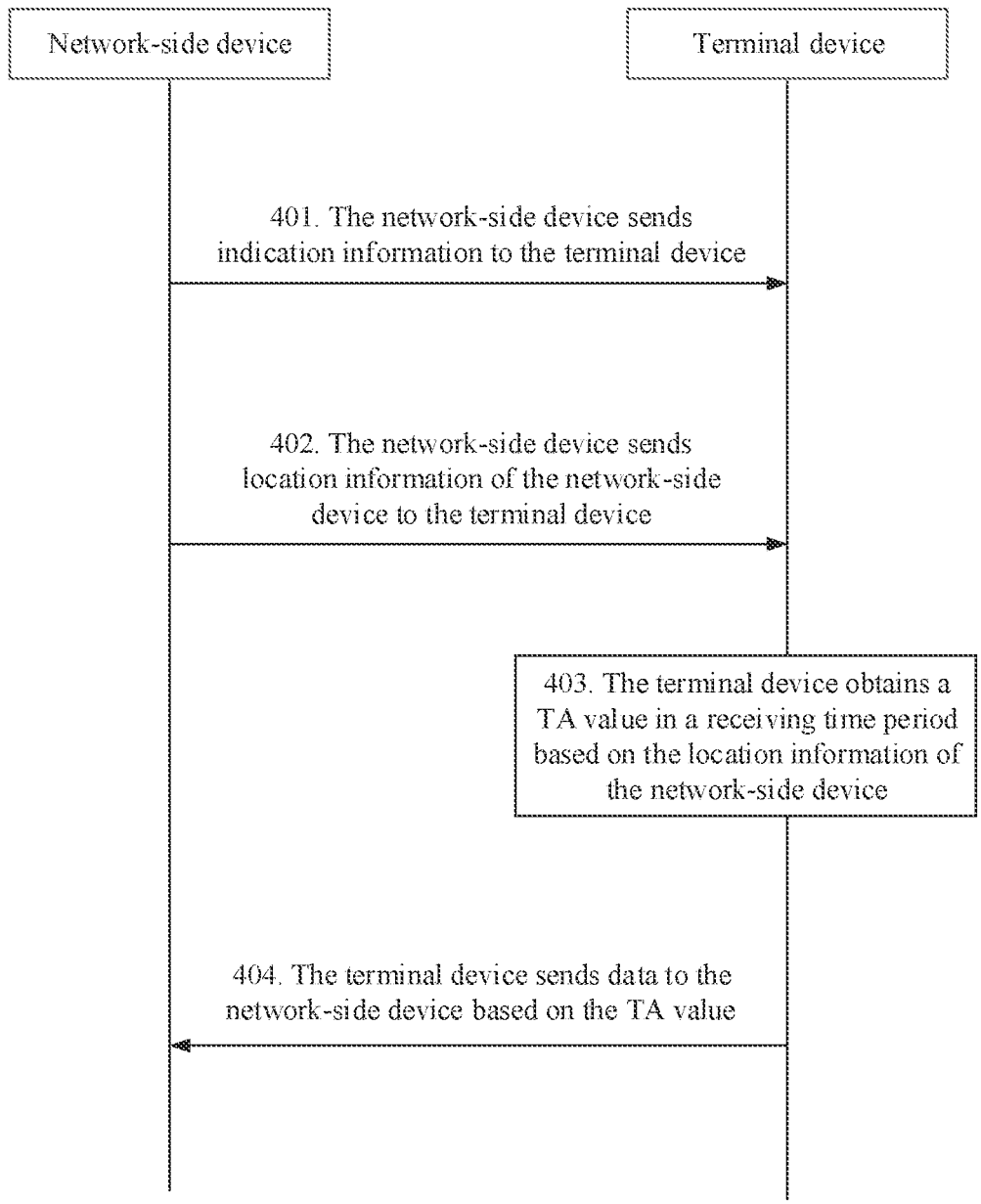
FIG. 4 is a schematic diagram of another embodiment of a data transmission method according to an embodiment of this application.

As shown in FIG. 4, the fourth embodiment provides a data transmission method. The method may include the following steps.

401. A network-side device sends indication information to a terminal device.

The network-side device sends the indication information to the terminal device. The indication information is used to indicate a receiving time period. The receiving time period is after a PSM period. Duration of the receiving time period may be determined by the network-side device according to a definition in NR/LTE or another standard, or may be preconfigured in a system, or may be agreed upon between the terminal device and the network-side device. A specific manner of determining the duration of the receiving time period is not limited herein. When the duration of the receiving time period is agreed upon between the terminal device and the network-side device, specifically, the terminal device may send a reference value to the network-side device, and the network-side device may determine the duration of the receiving time period based on the reference value and an overall service status in a communications system including the network-side device and the terminal device. The duration of the receiving time period may be tens of seconds to tens of minutes. There may be further a system synchronization period before the PSM period. In the system synchronization period, the terminal device may receive pilot information sent by the network-side device. The pilot information is used to ensure time synchronization of the communications system. The terminal device may be an internet of things device, and the network-side device may be a satellite base station.

402. The network-side device sends location information of the network-side device to the terminal device.

The network-side device sends the location information of the network-side device to the terminal device. A moment when the network-side device sends the location information of the network-side device to the terminal device may be before or in the receiving time period. This is not limited herein. The terminal device receives the location information of the network-side device in the receiving time period. A location of the network-side device may be a relative location or an absolute location of the network-side device. If the location of the network-side device is a relative location, the relative location may be a location relative to the terminal device, or may be a location relative to another reference point. This is not limited herein. If the location of the network-side device is an absolute location, the absolute location may be a location represented by a longitude and a latitude, or an absolute location in another reference system.

403. The terminal device obtains a TA value in the receiving time period based on the location information of the network-side device.

The terminal device obtains the TA value in the receiving time period based on the location information of the network-side device. If the location of the network-side device is a relative location based on the terminal device, the terminal device may directly obtain a distance between the network-side device and the terminal device based on the location of the network-side device. If the location of the network-side device is a location based on another reference point or an absolute location, the terminal device obtains a distance between the network-side device and the terminal device based on the location of the network-side device and a location of the terminal device.

The terminal device divides the distance between the network-side device and the terminal device by a propagation speed of a transmit signal in a medium to obtain a transmission delay of transmitting the transmit signal between the network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The network-side device is in a receiving state in an $N^{th}$ timeslot after the terminal device sends data. The terminal device may obtain uplink and downlink information of the network-side device based on a broadcast channel of the network-side device, and further obtain the value of N.

404. The terminal device sends data to the network-side device based on the TA value.

The terminal device determines, based on the TA value obtained in the receiving time period in step 403, a starting moment for sending the data, and the terminal device sends the data to the network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the terminal device obtains the TA value based on the location information of the network-side device that is received in the receiving time period. Then the terminal device determines, based on the TA value, a starting time for sending the data to the network-side device. The terminal device directly receives the location information of the network-side device from the network-side device, without performing extra calculation, thereby reducing operation steps of the terminal device. In addition, it can be ensured that the network-side device is in a receiving state when the data is transmitted to the network-side device, so that the data can be properly received by the network-side device.

In the second embodiment to the fourth embodiment, the method for obtaining the TA value is as follows: The terminal device calculates the TA value in the receiving time period. A fifth embodiment provides another method: The TA value may be calculated by the network-side device and then received by the terminal device from the network-side device.

Figure 5:
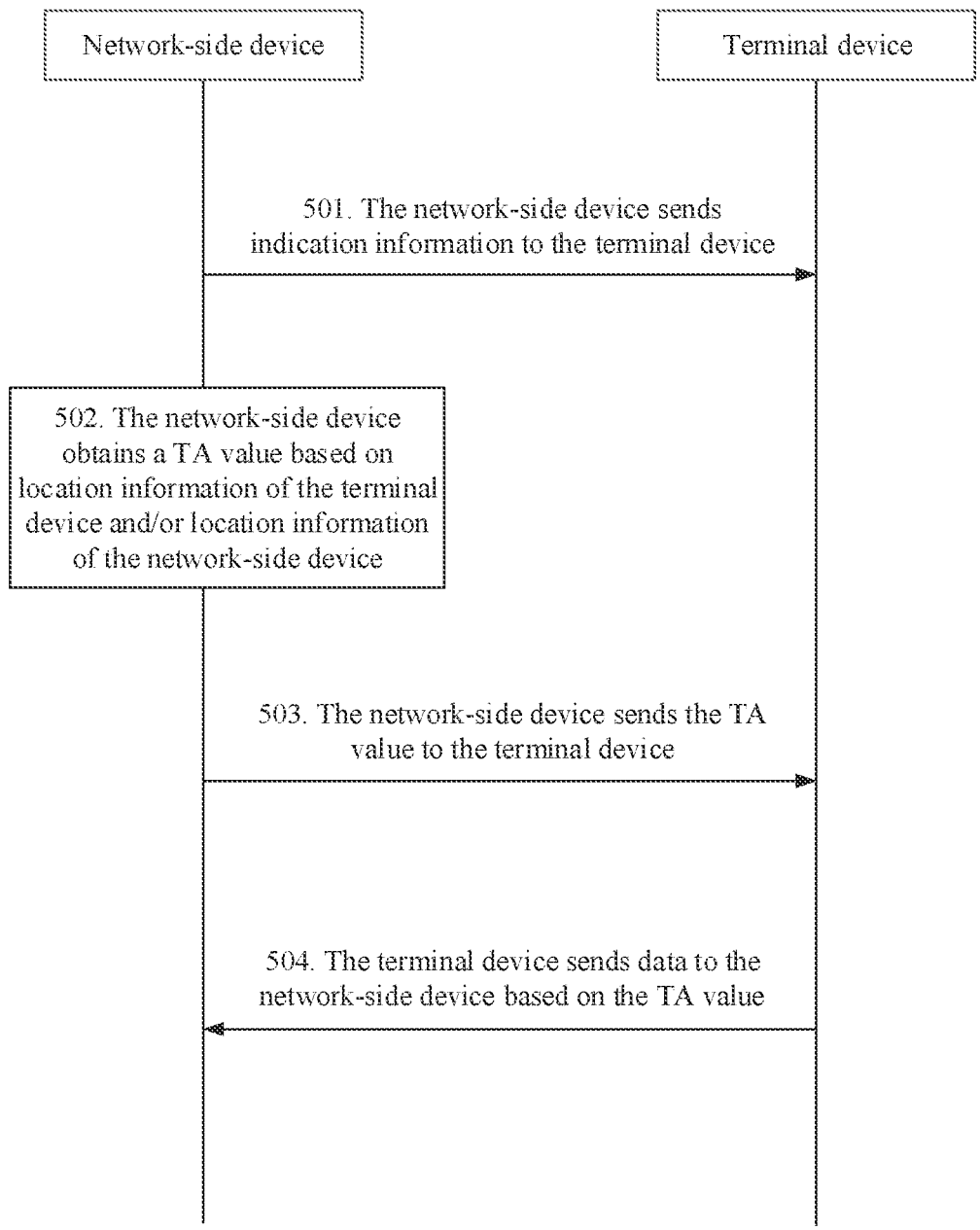
FIG. 5 is a schematic diagram of another embodiment of a data transmission method according to an embodiment of this application.

As shown in FIG. 5, the fifth embodiment provides a data transmission method. The method may include the following steps.

501. A network-side device sends indication information to a terminal device.

The network-side device sends the indication information to the terminal device. The indication information is used to indicate a receiving time period. The receiving time period is after a PSM period. Duration of the receiving time period may be determined by the network-side device according to a definition in NR/LTE or another standard, or may be preconfigured in a system, or may be agreed upon between the terminal device and the network-side device. A specific manner of determining the duration of the receiving time period is not limited herein. When the duration of the receiving time period is agreed upon between the terminal device and the network-side device, specifically, the terminal device may send a reference value to the network-side device, and the network-side device may determine the duration of the receiving time period based on the reference value and an overall service status in a communications system including the network-side device and the terminal device. The duration of the receiving time period may be tens of seconds to tens of minutes. There may be further a system synchronization period before the PSM period. In the system synchronization period, the terminal device may receive pilot information sent by the network-side device. The pilot information is used to ensure time synchronization of the communications system. The terminal device may be an internet of things device, and the network-side device may be a satellite base station.

502. The network-side device obtains a TA value based on location information of the terminal device and/or location information of the network-side device.

The network-side device obtains the TA value based on the location information of the terminal device and/or the location information of the network-side device. The location information of the terminal device may be calculated based on a previous TA value, or may be read from a cache, or may be obtained in another manner. This is not limited herein. A location of the terminal device may be a relative location or an absolute location. If the location of the terminal device is a relative location, the relative location may be a location relative to the network-side device, or may be a location relative to another reference point. This is not limited herein. If the location of the terminal device is an absolute location, the absolute location may be a location represented by a longitude and a latitude, or an absolute location in another reference system.

When the location of the terminal device is a relative location relative to the network-side device, the network-side device directly obtains a distance between the network-side device and the terminal device based on the relative location. When the location of the terminal device is an absolute location or a location based on another reference point, the network-side device obtains a distance between the network-side device and the terminal device based on the location of the terminal device and a location of the network-side device.

After obtaining the distance between the network-side device and the terminal device, the network-side device divides the distance between the network-side device and the terminal device by a propagation speed of a transmit signal in a medium to obtain a transmission delay of transmitting the transmit signal between the network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The network-side device is in a receiving state in an $N^{th}$ timeslot after the terminal device sends data. The terminal device may obtain uplink and downlink information of the network-side device based on a broadcast channel of the network-side device, and further obtain the value of N.

503. The network-side device sends the TA value to the terminal device.

After obtaining the TA value in step 502, the network-side device sends the TA value to the terminal device. A moment when the network-side device sends the TA value may be before or in the receiving time period. The terminal device receives the TA value in the receiving time period.

504. The terminal device sends data to the network-side device based on the TA value.

The terminal device receives the TA value from the network-side device in the receiving time period, and then determines, based on the received TA value, a starting moment for sending the data. The terminal device sends the data to the network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the terminal device receives, in the receiving time period after the PSM period, the TA value sent by the network-side device. The TA value is determined by the network-side device based on the location information of the terminal device and/or the location information of the network-side device. Because the network-side device has a stronger calculation capability than the terminal device, calculating the TA value by the network-side device can reduce calculation load of the terminal device. In addition, the terminal device then determines, based on the obtained TA value, a starting time for sending the data to the network-side device, thereby ensuring that the network-side device is in a receiving state when the data is transmitted to the network-side device, so that the data can be properly received by the network-side device.

The fifth embodiment provides a method: A network-side device obtains a TA value based on location information of a terminal device and/or location information of the network-side device. In the method, the network-side device may determine the location information of the terminal device by using a plurality of methods. A sixth embodiment provides a method: A network-side device may determine location information of a terminal device based on a previous TA value.

Figure 6:
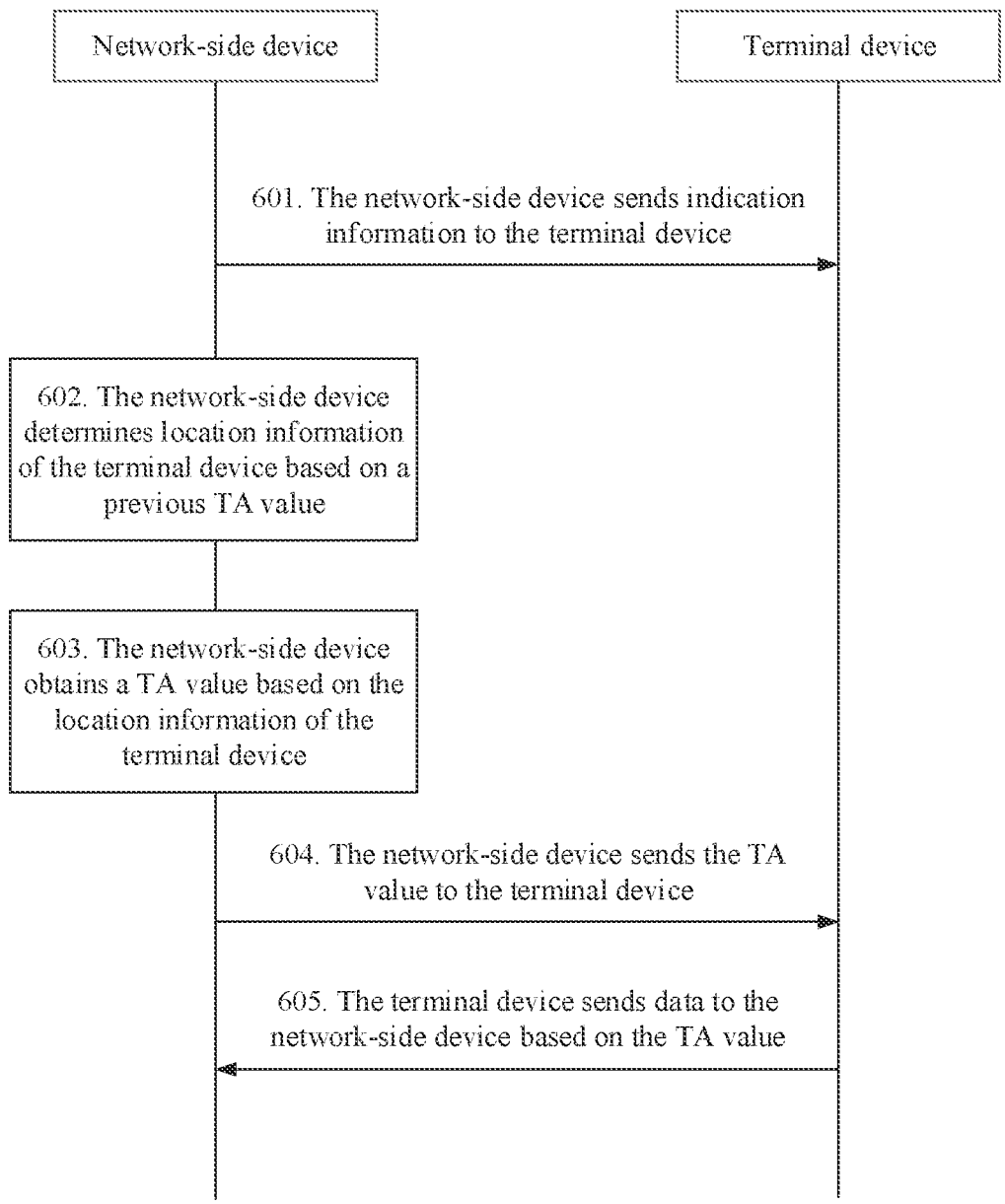
FIG. 6 is a schematic diagram of another embodiment of a data transmission method according to an embodiment of this application.

As shown in FIG. 6, the sixth embodiment provides a data transmission method. The method may include the following steps.

601. A network-side device sends indication information to a terminal device.

The network-side device sends the indication information to the terminal device. The indication information is used to indicate a receiving time period. The receiving time period is after a PSM period. Duration of the receiving time period may be determined by the network-side device according to a definition in NR/LTE or another standard, or may be preset in a system, or may be agreed upon between the terminal device and the network-side device. A specific manner of determining the duration of the receiving time period is not limited herein. When the duration of the receiving period is agreed upon between the terminal device and the network-side device, specifically, the terminal device may send a reference value to the network-side device, and the network-side device may determine the duration of the receiving time period based on the reference value and an overall service status in a communications system including the network-side device and the terminal device. The duration of the receiving time period may be tens of seconds to tens of minutes. There may be further a system synchronization period before the PSM period. In the system synchronization period, the terminal device may receive pilot information sent by the network-side device. The pilot information is used to ensure time synchronization of the communications system. The terminal device may be an internet of things device, and the network-side device may be a satellite base station.

602. The network-side device determines location information of the terminal device based on a previous TA value.

The network-side device determines the location information of the terminal device based on the previous TA value. Then the network-side device calculates a previous transmission delay based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and is obtained by the network-side device based on uplink and downlink information of the network-side device. The network-side device is in a receiving state in an $n^{th}$ timeslot after the terminal device sends data.

The previous TA value may be calculated by the network-side device. After the previous TA value is calculated, the previous TA value is stored locally. Based on the formula, the network-side device may calculate the previous transmission delay based on the previous TA value. The network-side device multiplies the previous transmission delay by a propagation speed of a transmit signal in a medium to obtain a distance between the network-side device and the terminal device. The propagation speed of the transmit signal in the medium may be a speed of light, or may be another value in a specific environment. This is not limited herein. The network-side device knows a motion trajectory of the network-side device, and therefore may know location information of the network-side device at a moment when the network-side device calculates a TA value last time. The location information of the terminal device may be determined based on the location information of the network-side device and the distance between the network-side device and the terminal device. In this scenario, an absolute location of the terminal device may not change, and a change of relative locations of the terminal device and the network-side device is caused by a change of an absolute location of the network-side device.

603. The network-side device obtains a TA value based on the location information of the terminal device.

The network-side device calculates a current distance between the network-side device and the terminal device based on the location information of the terminal device that is obtained in step 602 and with reference to a current location of the network-side device, and divides the distance between the network-side device and the terminal device by the propagation speed of the transmit signal in the medium to obtain a transmission delay of transmitting the transmit signal between the network-side device and the terminal device. The propagation speed of the transmit signal in the medium may be a speed of light, or may be another value in a specific environment. This is not limited herein. Then the TA value is calculated based on the following formula 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The network-side device is in a receiving state in the $N^{th}$ timeslot after the terminal device sends data. The terminal device may obtain uplink and downlink information of the network-side device based on a broadcast channel of the network-side device, and further obtain the value of N.

604. The network-side device sends the TA value to the terminal device.

The network-side device sends the TA value determined in step 603 to the terminal device. The network-side device may send the TA value before or in the receiving time period. The terminal device receives the TA value in the receiving time period.

605. The terminal device sends data to the network-side device based on the TA value.

The terminal device determines, based on the TA value that is sent by the network-side device and that is received in the receiving time period in step 604, a starting moment for sending the data, and the terminal device sends the data to the network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the network-side device determines the location information of the terminal device based on the previous TA value, determines the current TA value based on the location information of the terminal device, and then sends the current TA value to the terminal device. The network-side device may determine the location information of the terminal device based on the previous TA value, to ensure accuracy of a location of the terminal device. Then the terminal device determines, based on the current TA value received in the receiving time period, a starting time for sending the data to the network-side device, thereby ensuring that the network-side device is in a receiving state when the data is transmitted to the network-side device, so that the data can be properly received by the network-side device.

The fifth embodiment provides a method: A network-side device obtains a TA value based on location information of a terminal device and/or location information of the network-side device. In the method, the network-side device may determine the location information of the terminal device by using a plurality of methods. The sixth embodiment provides a method: A network-side device may determine location information of a terminal device based on a previous TA value. A seventh embodiment provides another method: A network-side device may read location information of a terminal device from a cache.

Figure 7:
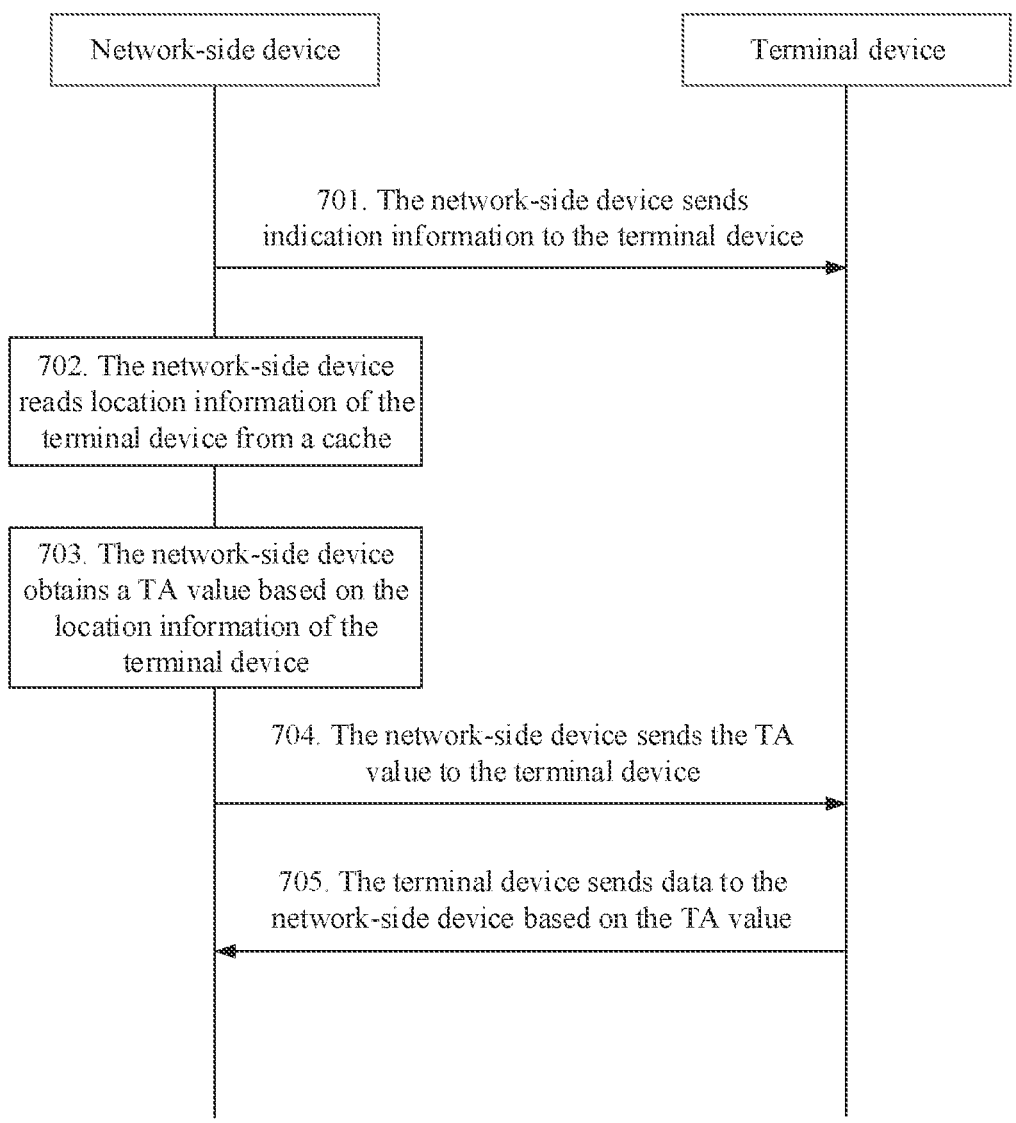
FIG. 7 is a schematic diagram of another embodiment of a data transmission method according to an embodiment of this application.

As shown in FIG. 7, the seventh embodiment provides a data transmission method. The method may include the following steps.

701. A network-side device sends indication information to a terminal device.

The network-side device sends the indication information to the terminal device. The indication information is used to indicate a receiving time period. The receiving time period is after a PSM period. Duration of the receiving time period may be determined by the network-side device according to a definition in NR/LTE or another standard, or may be preset in a system, or may be agreed upon between the terminal device and the network-side device. A specific manner of determining the duration of the receiving time period is not limited herein. When the duration of the receiving time period is agreed upon between the terminal device and the network-side device, specifically, the terminal device may send a reference value to the network-side device, and the network-side device may determine the duration of the receiving time period based on the reference value and an overall service status in a communications system including the network-side device and the terminal device. There may be further a system synchronization period before the PSM period. In the system synchronization period, the terminal device may receive pilot information sent by the network-side device. The pilot information is used to ensure time synchronization of the communications system. The terminal device may be an internet of things device, and the network-side device may be a satellite base station.

702. The network-side device reads location information of the terminal device from a cache.

The network-side device reads the location information of the terminal device from the cache. In this scenario, an absolute location of the terminal device may not change, and a change of relative locations of the terminal device and the network-side device is caused by a change of an absolute location of the network-side device. Therefore, the network-side device may locally cache information about the absolute location of the terminal device. When the information about the absolute location of the terminal device needs to be used for calculating a TA value, the network-side device reads the location information of the terminal device from the cache.

703. The network-side device obtains a TA value based on the location information of the terminal device.

The network-side device calculates a distance between the network-side device and the terminal device based on the location information of the terminal device that is read from the cache in step 702 and with reference to a current location of the network-side device. The network-side device divides the distance between the network-side device and the terminal device by a propagation speed of a transmit signal in a medium to obtain a transmission delay of transmitting the transmit signal between the network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The network-side device is in a receiving state in an $N^{th}$ timeslot after the terminal device sends data. The terminal device may obtain uplink and downlink information of the network-side device based on a broadcast channel of the network-side device, and further obtain the value of N.

704. The network-side device sends the TA value to the terminal device.

The network-side device sends the TA value determined in step 703 to the terminal device. The network-side device may send the TA value before or in the receiving time period. The terminal device receives the TA value in the receiving time period.

705. The terminal device sends data to the network-side device based on the TA value.

The terminal device determines, based on the TA value that is sent by the network-side device and that is received in the receiving time period in step 704, a starting moment for sending the data, and the terminal device sends the data to the network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the network-side device reads the location information of the terminal device from the cache, and the network-side device obtains the TA value based on the location information of the terminal device. Then the TA value is sent to the terminal device. The network-side device directly reads the location information of the terminal device from the cache, so that steps of obtaining the location information of the terminal device are more concise, and a calculation process of the network-side device is simplified. Then the terminal device determines, based on the TA value received in the receiving time period, a starting time for sending the data to the network-side device, thereby ensuring that the network-side device is in a receiving state when the data is transmitted to the network-side device, so that the data can be properly received by the network-side device.

The methods provided in the first embodiment to the seventh embodiment are based on that the network-side device is within a service range of the terminal device before and after the PSM period, that is, the network-side device does not change. An eighth embodiment provides a method. The method is applicable to a case in which a handover occurs between a source network-side device and a new network-side device. A terminal device obtains a TA value in a receiving time period based on location information of the terminal device and/or location information of the new network-side device.

Figure 8:
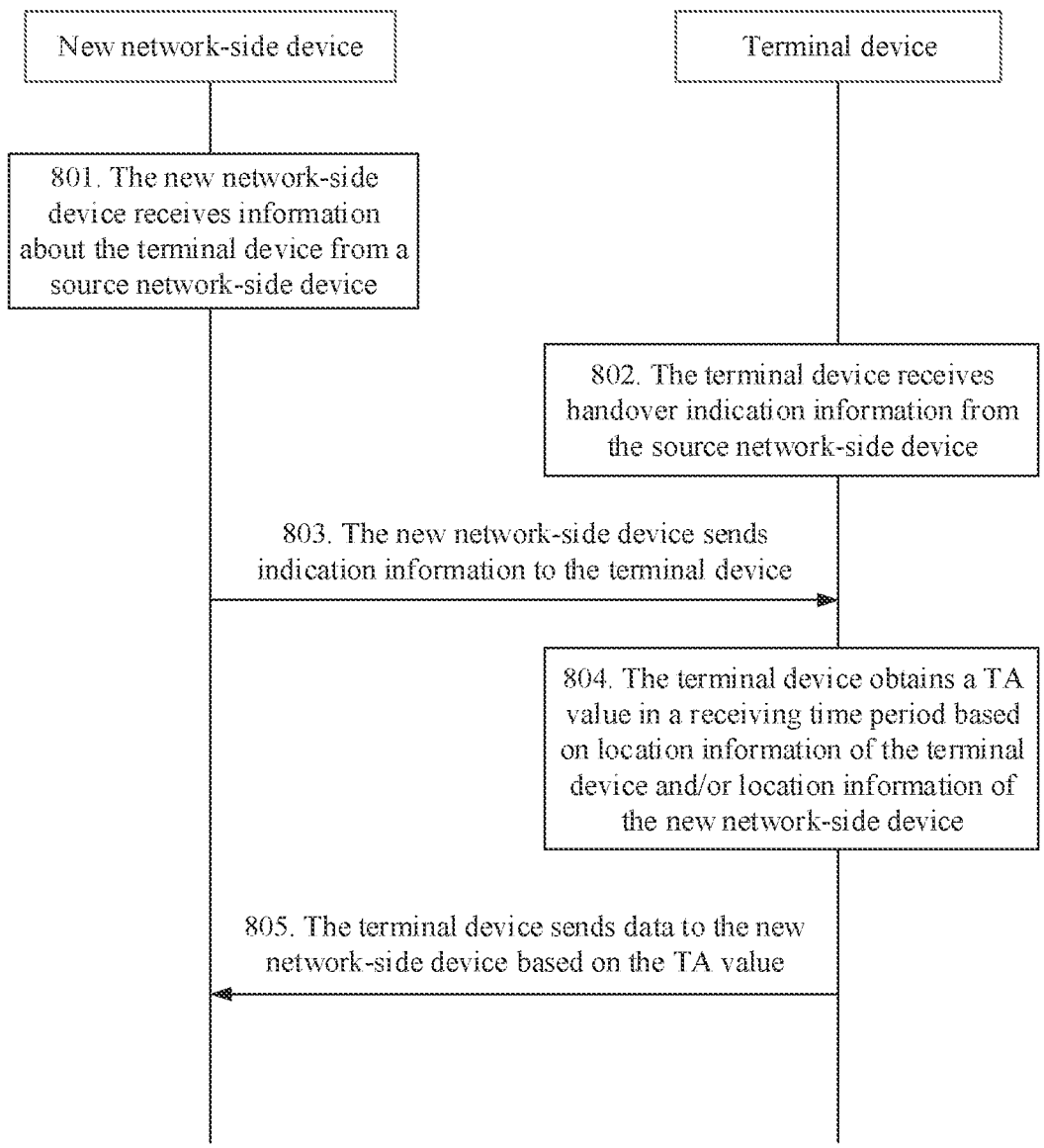
FIG. 8 is a schematic diagram of another embodiment of a data transmission method according to an embodiment of this application.

As shown in FIG. 8, the eighth embodiment provides a data transmission method. The method may include the following steps.

801. A new network-side device receives information about a terminal device from a source network-side device.

The new network-side device receives the information about the terminal device from the source network-side device. Because the source network-side device moves or the terminal device moves, relative locations of the source network-side device and the terminal device may have changed greatly, and a location of the terminal device may no longer be within a service range of the source network device. Both the source network-side device and the new network-side device may be satellite base stations. The source network-side device may determine, based on a motion trajectory of the source network-side device, that after a next PSM period, the source network-side device cannot receive data collected by the terminal device. In this case, the source network-side device sends the information about the terminal device to the new network-side device. The information about the terminal device includes at least an ID of the terminal device. A moment when the source network-side device sends the information about the terminal device to the new network-side device is not limited, and may be before or in a current PSM period, or may be after the PSM period. If a current TA value is calculated by the source network-side device after the PSM period, the source network-side device needs to send the information about the terminal device to the new network-side device after the PSM period, and the information about the terminal device further includes the current TA value calculated by the source network-side device. The information about the terminal device is used to indicate the new network-side device to send indication information to the terminal device before the next PSM period. If both the source network-side device and the new network-side device are satellite base stations, the source network-side device may send the information about the terminal device to the network-side device through an inter-satellite link; or the source network-side device may send the information about the terminal device to a terrestrial base station, and then the terrestrial base station forwards the information about the terminal device to the network-side device.

802. The terminal device receives handover indication information from the source network-side device.

The terminal device receives the handover indication information from the source network-side device. The handover indication information includes information about the new network-side device, and the information about the new network-side device includes at least an ID of the new network-side device. The source network-side device may determine, based on the motion trajectory of the source network-side device, that after the next PSM period, the source network-side device cannot receive data collected by the terminal device. The handover indication information is used to indicate the terminal device to hand over to the new network-side device, that is, indicate the terminal device to receive indication information from the new network-side device before the next PSM period. Both the source network-side device and the new network-side device may be satellite base stations. The source network-side device may add the information about the new network-side device to the indication information sent to the terminal device before the current PSM period. The information about the new network-side device may be included in a data frame sent by the source network-side device to the terminal device. The terminal device may alternatively receive, in a period before or after the PSM period, the information about the new network-side device that is sent by the source network-side device. There is no time sequence between step 801 and step 802.

803. The new network-side device sends indication information to the terminal device.

The new network-side device sends the indication information to the terminal device. The indication information is used to indicate a receiving time period. The receiving time period is after a PSM period. Duration of the receiving time period may be determined by the new network-side device according to a definition in NR/LTE or another standard, or may be preconfigured in a system, or may be agreed upon between the terminal device and the new network-side device. A specific manner of determining the duration of the receiving time period is not limited herein. When the duration of the receiving time period is agreed upon between the terminal device and the new network-side device, specifically, the terminal device may send a reference value to the new network-side device, and the new network-side device may determine the duration of the receiving time period based on the reference value and an overall service status in a communications system including the new network-side device and the terminal device. There may be further a system synchronization period before the PSM period. In the system synchronization period, the terminal device may receive pilot information sent by the new network-side device. The pilot information is used to ensure time synchronization of the communications system.

804. The terminal device obtains a TA value in the receiving time period based on location information of the terminal device and/or location information of the network-side device.

The terminal device determines the receiving time period based on the indication information received from the new network-side device in step 803, and the terminal device obtains the TA value in the receiving time period. The TA value may be calculated by the terminal device. Before calculating the TA value, the terminal device needs to obtain a distance difference between the new network-side device and the terminal device. The distance difference may be determined based on absolute locations of the new network-side device and the terminal device, or is determined based on relative locations of the new network-side device and the terminal device based on a reference point, or may be determined based on a relative location of the new network-side device based on the terminal device or a relative location of the terminal device based on the new network-side device. If the distance difference is determined based on the absolute locations of the new network-side device and the terminal device, the absolute locations may be represented by longitudes and latitudes or by absolute locations in another reference system.

The calculation may be performed in the following manner: A distance between the new network-side device and the terminal device is first calculated based on the location information of the terminal device and the location information of the new network-side device. The distance between the new network-side device and the terminal device is divided by a propagation speed of a transmit signal in a medium to obtain a transmission delay of transmitting the transmit signal between the new network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The new network-side device is in a receiving state in an $N^{th}$ timeslot after the terminal device sends data. The terminal device may obtain uplink and downlink information of the new network-side device based on a broadcast channel of the new network-side device, and further obtain the value of N.

805. The terminal device sends data to the new network-side device based on the TA value.

The terminal device determines, based on the TA value obtained in step 804, a starting moment for sending the data, and the terminal device sends the data to the new network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the source network-side device may determine, based on the motion trajectory of the source network-side device, that after the next PSM period, the source network-side device cannot receive data sent by the terminal device.

Therefore, the source network-side device sends the information about the terminal device to the new network-side device, to indicate the new network-side device to send indication information to the terminal device before the next PSM period. The source network-side device sends the handover indication information to the terminal device. The handover indication information is used to indicate the terminal device to hand over to the new network-side device, that is, indicate the terminal device to receive indication information from the new network-side device before the next PSM period. After determining the receiving time period based on the indication information sent by the new network-side device, the terminal device obtains the TA value in the receiving time period based on the location information of the terminal device and/or the location information of the new network-side device, and determines, based on the TA value, a starting time for sending the data, thereby ensuring that the new network-side device is in the receiving state when the data is transmitted to the new network-side device, so that the data can be properly received by the new network-side device. In the method, a problem that the data sent by the terminal device cannot be properly received after the handover between the source network-side device and the new network-side device is resolved.

The methods provided in the first embodiment to the seventh embodiment are all based on that the network-side device is within a service range of the terminal device before and after the PSM period, that is, the network-side device does not change. The eighth embodiment provides a method. The method is applicable to a case in which a handover occurs between a source network-side device and a new network-side device. A terminal device obtains a TA value in a receiving time period based on location information of the terminal device and/or location information of the new network-side device. A ninth embodiment provides another method. The method is applicable to a case in which a handover occurs between a source network-side device and a new network-side device. The new network-side device obtains a TA value based on location information of a terminal device and/or location information of the new network-side device.

Figure 9:
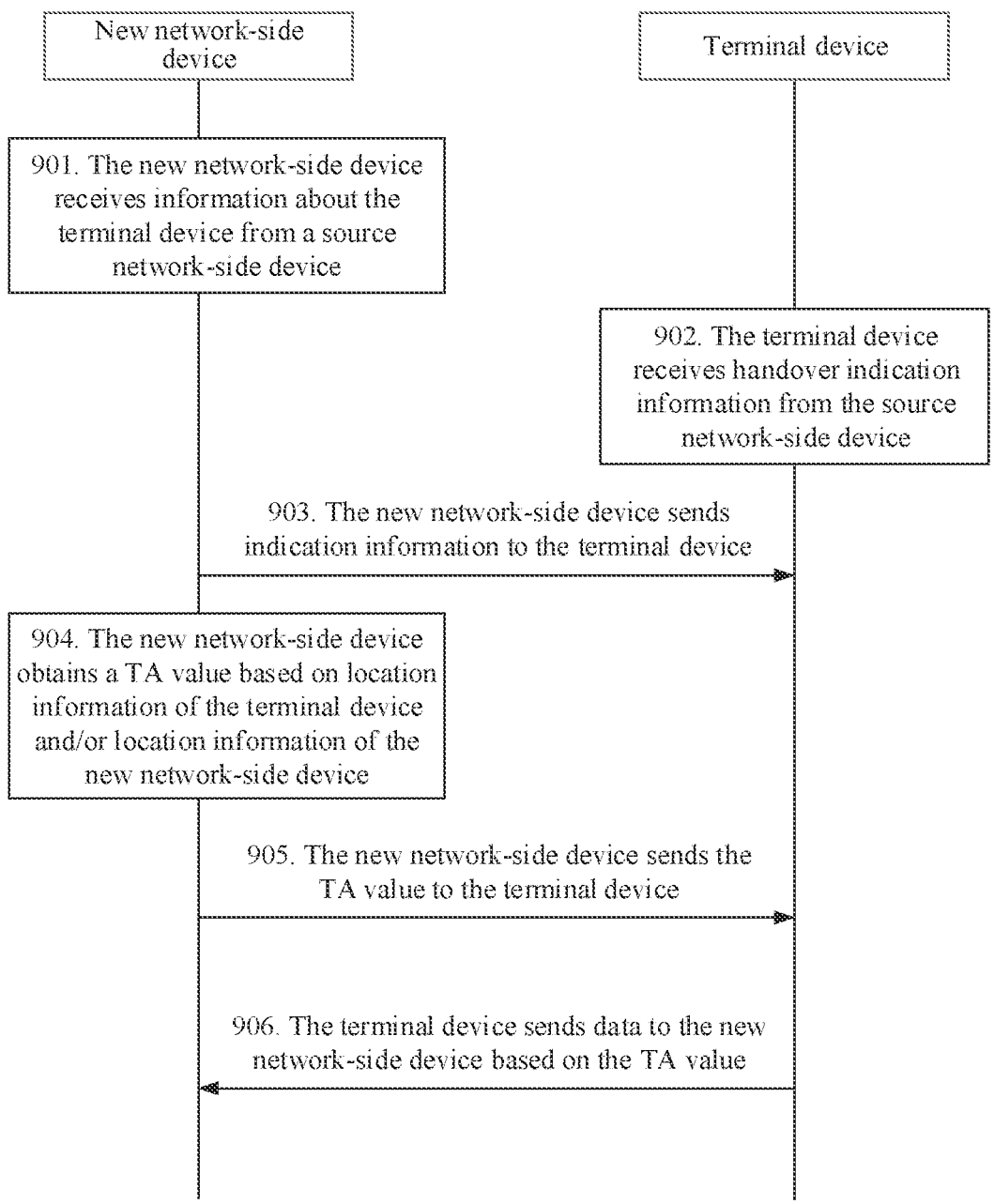
FIG. 9 is a schematic diagram of another embodiment of a data transmission method according to an embodiment of this application.

As shown in FIG. 9, the ninth embodiment provides a data transmission method. The method may include the following steps.

901. A new network-side device receives information about a terminal device from a source network-side device.

The new network-side device receives the information about the terminal device from the source network-side device. Because the source network-side device moves or the terminal device moves, relative locations of the source network-side device and the terminal device may have changed greatly, and a location of the terminal device may no longer be within a service range of the source network device. Both the source network-side device and the new network-side device may be satellite base stations. The source network-side device may determine, based on a motion trajectory of the source network-side device, that after a next PSM period, the source network-side device cannot receive data collected by the terminal device. In this case, the source network-side device sends the information about the terminal device to the new network-side device. The information about the terminal device includes at least an ID of the terminal device. A moment when the source network-side device sends the information about the terminal device to the new network-side device is not limited, and may be before or in a current PSM period, or may be after the PSM period. If a current TA value is calculated by the source network-side device after the PSM period, the source network-side device needs to send the information about the terminal device to the new network-side device after the PSM period, and the information about the terminal device further includes the current TA value calculated by the source network-side device. The information about the terminal device is used to indicate the new network-side device to send indication information to the terminal device before the next PSM period. If both the source network-side device and the new network-side device are satellite base stations, the source network-side device may send the information about the terminal device to the new network-side device through an inter-satellite link: or the source network-side device may send the information about the terminal device to a terrestrial base station, and then the terrestrial base station forwards the information about the terminal device to the new network-side device.

902. The terminal device receives handover indication information from the source network-side device.

The terminal device receives the handover indication information from the source network-side device. The handover indication information includes information about the new network-side device, and the information about the new network-side device includes at least an ID of the new network-side device. The source network-side device may determine, based on the motion trajectory of the source network-side device, that after the next PSM period, the source network-side device cannot receive data collected by the terminal device. The handover indication information is used to indicate the terminal device to hand over to the new network-side device, that is, indicate the terminal device to receive indication information from the new network-side device before the next PSM period. Both the source network-side device and the new network-side device may be satellite base stations. The source network-side device may add the information about the new network-side device to the indication information sent to the terminal device before the current PSM period. The information about the new network-side device may be included in a data frame sent by the source network-side device to the terminal device. The terminal device may alternatively receive, in a period before or after the PSM period, the information about the new network-side device that is sent by the source network-side device. There is no time sequence between step 901 and step 902.

903. The new network-side device sends indication information to the terminal device.

The new network-side device sends the indication information to the terminal device. The indication information is used to indicate a receiving time period. The receiving time period is after a PSM period. Duration of the receiving time period may be determined by the new network-side device according to a definition in NR/LTE or another standard, or may be preconfigured in a system, or may be agreed upon between the terminal device and the new network-side device. A specific manner of determining the duration of the receiving time period is not limited herein. When the duration of the receiving time period is agreed upon between the terminal device and the new network-side device, specifically, the terminal device may send a reference value to the new network-side device, and the new network-side device may determine the duration of the receiving time period based on the reference value and an overall service status in a communications system including the new network-side device and the terminal device. There may be further a system synchronization period before the PSM period. In the system synchronization period, the terminal device may receive pilot information sent by the new network-side device. The pilot information is used to ensure time synchronization of the communications system.

904. The new network-side device obtains a TA value based on location information of the terminal device and/or location information of the network-side device.

The new network-side device obtains the TA value based on the location information of the terminal device and/or the location information of the new network-side device. The location information of the terminal device may be calculated based on a previous TA value, or may be read from a cache, or may be obtained in another manner. This is not limited herein. If the location information of the terminal device is calculated based on the previous TA value, the new network-side device needs to receive the previous TA value from the source network-side device. A location of the terminal device may be a relative location or an absolute location. If the location of the terminal device is a relative location, the relative location may be a location relative to the new network-side device, or may be a location relative to another reference point. This is not limited herein. If the location of the terminal device is an absolute location, the absolute location may be a location represented by a longitude and a latitude, or an absolute location in another reference system.

When the location of the terminal device is a relative location relative to the new network-side device, the new network-side device directly obtains a distance between the new network-side device and the terminal device based on the relative location. When the location of the terminal device is an absolute location or a location based on another reference point, the new network-side device obtains a distance between the new network-side device and the terminal device based on the location of the terminal device and a location of the new network-side device.

After obtaining the distance between the new network-side device and the terminal device, the new network-side device divides the distance between the new network-side device and the terminal device by a propagation speed of a transmit signal in a medium to obtain a transmission delay of transmitting the transmit signal between the new network-side device and the terminal device. The propagation speed of the transmit signal in the medium may be a speed of light, or may be another value in a specific environment. This is not limited herein. Then the TA value is calculated based on the following formula: 2×Transmission delay−TA=N×Timeslot duration. In the formula, if communication is performed according to a standard in NR/LTE, the timeslot duration is 1 millisecond. If communication is performed according to another standard, the timeslot duration may be alternatively another value. A value of N may be a constant, and needs to meet the following requirement: The new network-side device is in a receiving state in an $N^{th}$ timeslot after the terminal device sends data. The terminal device may obtain uplink and downlink information of the new network-side device based on a broadcast channel of the new network-side device, and further obtain the value of N.

905. The new network-side device sends the TA value to the terminal device.

After obtaining the TA value in step 904, the new network-side device sends the TA value to the terminal device. A moment when the new network-side device sends the TA value may be before or in the receiving time period. The terminal device receives the TA value in the receiving time period.

906. The terminal device sends data to the new network-side device based on the TA value.

The terminal device receives the TA value from the new network-side device in the receiving time period, and then determines, based on the received TA value, a starting moment for sending the data. The terminal device sends the data to the new network-side device at the starting moment. The starting moment may be a moment of an uplink starting frame of the data. The data may be data collected by the terminal device in the PSM period, and may be a temperature or another parameter. This is not specifically limited.

In the method provided in this embodiment of this application, the source network-side device may determine, based on the motion trajectory of the source network-side device, that after the next PSM period, the source network-side device cannot receive data sent by the terminal device. Therefore, the source network-side device sends the information about the terminal device to the new network-side device, to indicate the new network-side device to send indication information to the terminal device before the next PSM period. The source network-side device sends the handover indication information to the terminal device. The handover indication information is used to indicate the terminal device to hand over to the new network-side device, that is, indicate the terminal device to receive indication information from the new network-side device before the next PSM period. After determining the receiving time period based on the indication information sent by the new network-side device, the terminal device receives, in the receiving time period, the TA value sent by the new network-side device. The TA value is determined by the new network-side device based on the location information of the terminal device and/or the location information of the new network-side device. The terminal device sends the data to the new network-side device based on the TA value, thereby ensuring that the new network-side device is in a receiving state when the data is transmitted to the new network-side device, so that the data can be properly received by the new network-side device. In the method, a problem that the data sent by the terminal device cannot be properly received after the handover between the source network-side device and the new network-side device is resolved.

Figure 10:
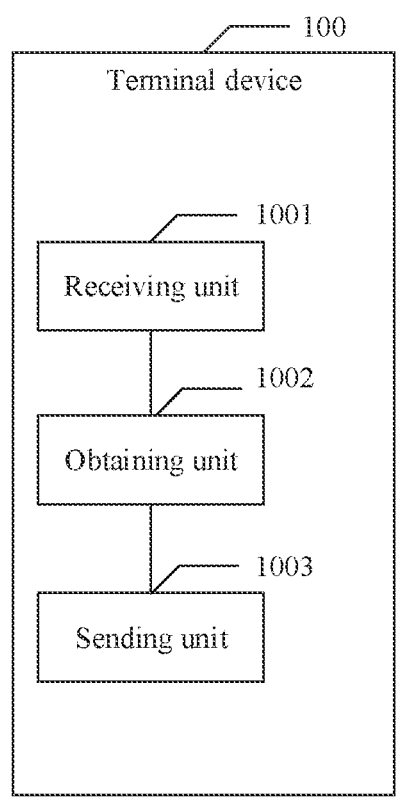
FIG. 10 is a schematic diagram of an embodiment of a terminal device according to an embodiment of this application.

As shown in FIG. 10, a tenth embodiment provides a terminal device 100. The terminal device 100 and corresponding units of the terminal device 100 are configured to perform the steps performed by the terminal device in the first embodiment, the ninth embodiment, and the fifth embodiment to the seventh embodiment. For details about execution processes and corresponding benefits, refer to the first embodiment, the ninth embodiment, and the fifth embodiment to the seventh embodiment for understanding. Details are not described herein again. The terminal device may include:

a receiving unit 1001, configured to receive indication information sent by a network-side device, where the indication information is used to indicate a receiving time period, and the receiving time period is after a power saving mode PSM period: further configured to receive location information of the network-side device that is sent by the network-side device; further configured to: before receiving the indication information sent by the network-side device, receive a TA value sent by the network-side device; and further configured to receive handover indication information sent by a source network-side device, where the handover indication information is used to indicate the terminal device to hand over to the network-side device;

an obtaining unit 1002, configured to obtain a timing advance TA value in the receiving time period; and further configured to: after the receiving unit 1001 receives the TA value sent by the network-side device, obtain the TA value from the receiving unit 1001; and a sending unit 1003, configured to send data to the network-side device based on the TA value.

In the terminal device provided in this embodiment of this application, the obtaining unit 1002 obtains the current TA value in the receiving time period after the PSM period. After the receiving time period, the terminal device determines, based on the current TA value, a starting time for sending the data to the network-side device, thereby ensuring that the network-side device is in a receiving state when the data is transmitted to the network-side device, so that the data can be properly received.

Figure 11:
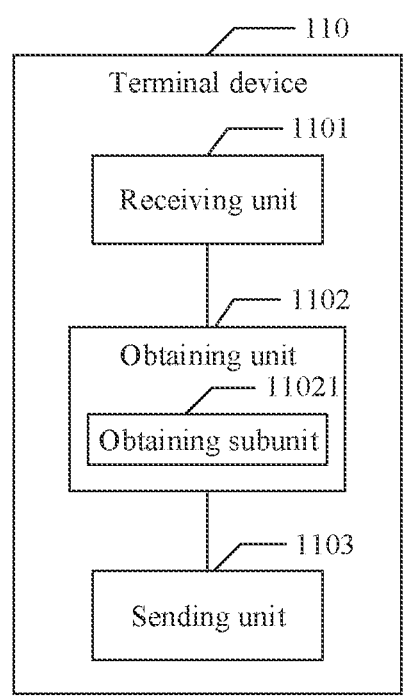
FIG. 11 is a schematic diagram of another embodiment of a terminal device according to an embodiment of this application.

As shown in FIG. 11, an eleventh embodiment provides a terminal device 110. The terminal device 110 and corresponding units of the terminal device 110 are configured to perform the steps performed by the terminal device in the second embodiment, the fourth embodiment, and the eighth embodiment. For details about execution processes and corresponding benefits, refer to the second embodiment, the fourth embodiment, and the eighth embodiment for understanding. Details are not described herein again. The terminal device 110 may include:

a receiving unit 1101, configured to receive indication information sent by a network-side device, where the indication information is used to indicate a receiving time period, and the receiving time period is after a power saving mode PSM period; further configured to receive location information of the network-side device that is sent by the network-side device; and further configured to receive handover indication information sent by a source network-side device, where the handover indication information is used to indicate the terminal device to hand over to the network-side device;

an obtaining unit 1102, configured to obtain a timing advance TA value in the receiving time period, where the obtaining unit 1102 may further include an obtaining subunit 11021, configured to obtain the TA value in the receiving time period based on location information of the terminal device and/or location information of the network-side device; and a sending unit 1103, configured to send data to the network-side device based on the TA value.

In the terminal device provided in this embodiment of this application, the obtaining subunit 11021 may obtain the TA value in the receiving time period after the PSM period based on the location information of the terminal device and/or the location information of the network-side device. After the receiving time period, the terminal device determines, based on the current TA value, a starting time for sending the data to the network-side device, thereby ensuring that the network-side device is in a receiving state when the data is transmitted to the network-side device, so that the data can be properly received.

Figure 12:
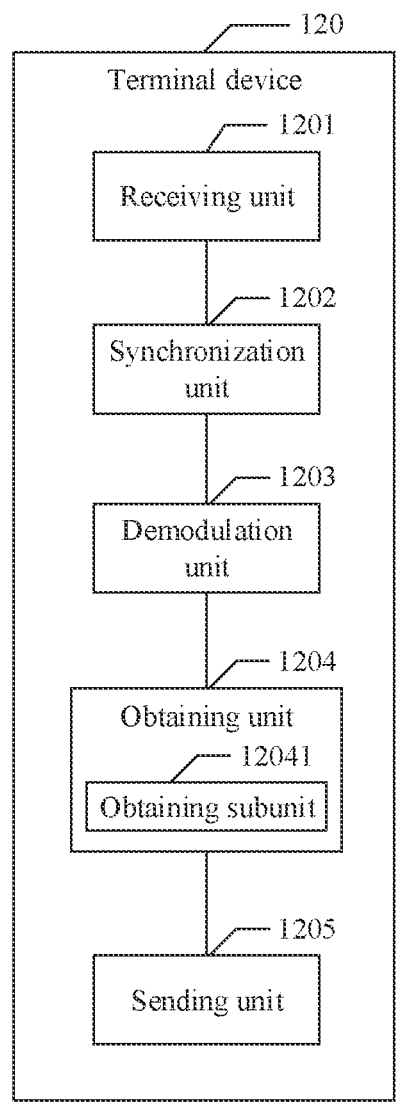
FIG. 12 is a schematic diagram of another embodiment of a terminal device according to an embodiment of this application.

As shown in FIG. 12, a twelfth embodiment provides a terminal device 120. The terminal device 120 and corresponding units of the terminal device 120 are configured to perform the steps performed by the terminal device in the third embodiment. For details about execution processes and corresponding benefits, refer to the third embodiment for understanding. Details are not described herein again. The terminal device 120 may include:

a receiving unit 1201, configured to receive indication information sent by a network-side device, where the indication information is used to indicate a receiving time period, and the receiving time period is after a power saving mode PSM period; and further configured to receive a paging signal from the network-side device in the receiving time period;

a synchronizing unit 1202, configured to synchronize downlink data in the receiving time period and obtain a downlink starting moment in the receiving time period:

a demodulation unit 1203, configured to demodulate the paging signal based on the downlink starting moment and obtain location information of the network-side device, where the paging signal is received by the receiving unit 1201 from the network-side device in the receiving time period;

an obtaining unit 1204, configured to obtain a timing advance TA value in the receiving time period indicated by the indication information received by the receiving unit 1201, where the obtaining unit 1204 may further include an obtaining subunit 12041, configured to obtain the TA value based on the location information of the network-side device that is obtained by the demodulation unit 1203: and a sending unit 1205, configured to send data to the network-side device based on the TA value obtained by the obtaining unit.

In the terminal device provided in this embodiment of this application, the synchronizing unit 1202 may synchronize the downlink data in the receiving time period after the PSM period and obtain the downlink starting moment in the receiving time period, and the demodulation unit 1203 may demodulate, based on the starting moment of the downlink data, the paging signal received by the receiving unit 1201 to obtain the location information of the network-side device. The obtaining subunit 12041 may obtain the TA value based on the location information of the terminal device and/or the location information of the network-side device. After the receiving time period, the terminal device determines, based on the current TA value, a starting time for sending the data to the network-side device, thereby ensuring that the network-side device is in a receiving state when the data is transmitted to the network-side device, so that the data can be properly received.

Figure 13:
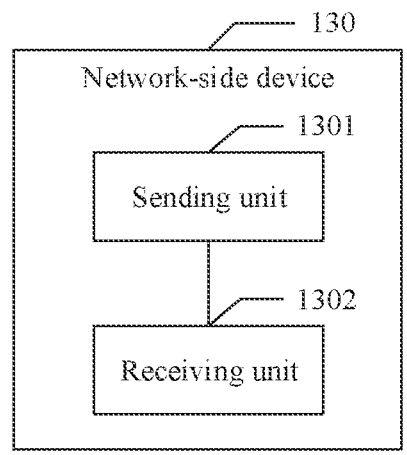
FIG. 13 is a schematic diagram of an embodiment of a network-side device according to an embodiment of this application.

As shown in FIG. 13, a thirteenth embodiment provides a network-side device 130. The network-side device 130 and corresponding units of the network-side device 130 are configured to perform the steps performed by the network-side device in the first embodiment to the fourth embodiment, and the eighth embodiment. For details about execution processes and corresponding benefits, refer to the first embodiment to the fourth embodiment, and the eighth embodiment for understanding. Details are not described herein again. The network-side device 130 may include:

a sending unit 1301, configured to send indication information to a terminal device, where the indication information is used to indicate a receiving time period, and the receiving time period is after a power saving mode PSM period: and further configured to send location information of the network-side device to the terminal device, where the location information of the network-side device is used by the terminal device to obtain a timing advance TA value; and a receiving unit 1302, configured to receive data from the terminal device; and further configured to receive information about the terminal device from a source network-side device, where the information about the terminal device is used to indicate the network-side device to send indication information to the terminal device.

In the network-side device provided in this embodiment of this application, the sending unit 1301 sends the indication information to the terminal device before the PSM period, where the indication information may indicate the receiving time period, and the receiving time period is after the power saving mode PSM period. The terminal device may obtain the TA value in the receiving time period, and the terminal device sends the data to the network-side device based on the TA value, thereby ensuring that the network-side device is in a receiving state when the data is transmitted to the network-side device, so that the data can be properly received by the receiving unit 1302.

Figure 14:
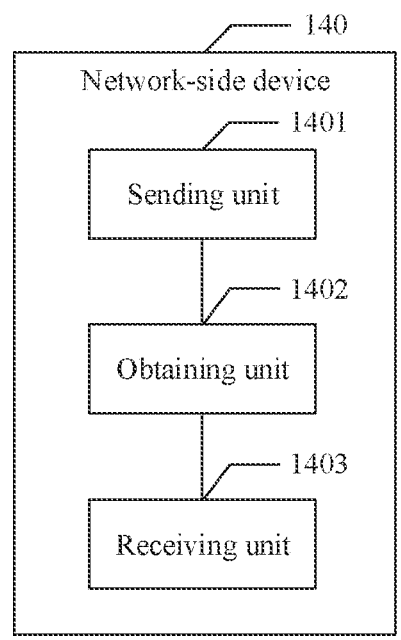
FIG. 14 is a schematic diagram of another embodiment of a network-side device according to an embodiment of this application.

As shown in FIG. 14, a fourteenth embodiment provides a network-side device 140. The network-side device 140 and corresponding units of the network-side device 140 are configured to perform the steps performed by the network-side device in the fifth embodiment or the ninth embodiment. For details about execution processes and corresponding benefits, refer to the fifth embodiment or the ninth embodiment for understanding. Details are not described herein again. The network-side device 140 may include:

- a sending unit 1401, configured to send indication information to a terminal device, where the indication information is used to indicate a receiving time period, and the receiving time period is after a power saving mode PSM period; and further configured to send a TA value to the terminal device;
- an obtaining unit 1402, configured to obtain the TA value based on location information of the terminal device and/or location information of the network-side device; and
- a receiving unit 1403, configured to receive data from the terminal device; and further configured to receive information about the terminal device from a source network-side device, where the information about the terminal device is used to indicate the network-side device to send indication information to the terminal device.

In the network-side device provided in this embodiment of this application, the sending unit 1401 sends the indication information to the terminal device before the PSM period, where the indication information may indicate the receiving time period, and the receiving time period is after the power saving mode PSM period. The obtaining unit 1402 may obtain the TA value before or in the receiving time period and send the TA value to the terminal device, and the terminal device receives the TA value in the receiving time period. The terminal device sends the data to the network-side device based on the TA value, thereby ensuring that the network-side device is in a receiving state when the data is transmitted to the network-side device, so that the data can be properly received by the receiving unit 1403.

Figure 15:
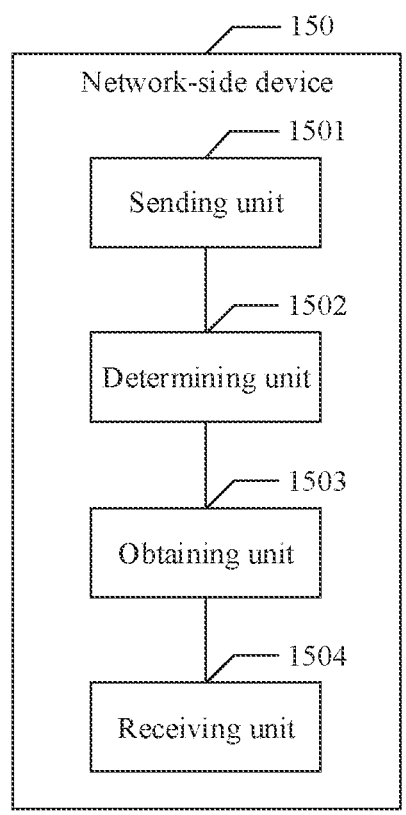
FIG. 15 is a schematic diagram of another embodiment of a network-side device according to an embodiment of this application.

As shown in FIG. 15, a fifteenth embodiment provides a network-side device 150. The network-side device 150 and corresponding units of the network-side device 150 are configured to perform the steps performed by the network-side device in the sixth embodiment. For details about execution processes and corresponding benefits, refer to the sixth embodiment for understanding. Details are not described herein again. The network-side device 150 may include:

- a sending unit 1501, configured to send indication information to a terminal device, where the indication information is used to indicate a receiving time period, and the receiving time period is after a power saving mode PSM period: and further configured to send a TA value to the terminal device;
- a determining unit 1502, configured to determine location information of the terminal device based on a previous TA value;
- an obtaining unit 1503, configured to obtain the TA value based on the location information of the terminal device and/or location information of the network-side device; and
- a receiving unit 1504, configured to send data to the network-side device based on the TA value obtained by the obtaining unit 1503.

In the network-side device provided in this embodiment of this application, the sending unit 1501 sends the indication information to the terminal device before the PSM period, where the indication information may indicate the receiving time period, and the receiving time period is after the power saving mode PSM period. The determining unit 1502 may obtain the location information of the terminal device based on the previous TA value. The obtaining unit 1503 obtains the current TA value based on the location information of the terminal device, and sends the TA value to the terminal device. The terminal device receives the TA value in the receiving time period. The terminal device sends the data to the network-side device based on the TA value, thereby ensuring that the network-side device is in a receiving state when the data is transmitted to the network-side device, so that the data can be properly received by the receiving unit 1504.

Figure 16:
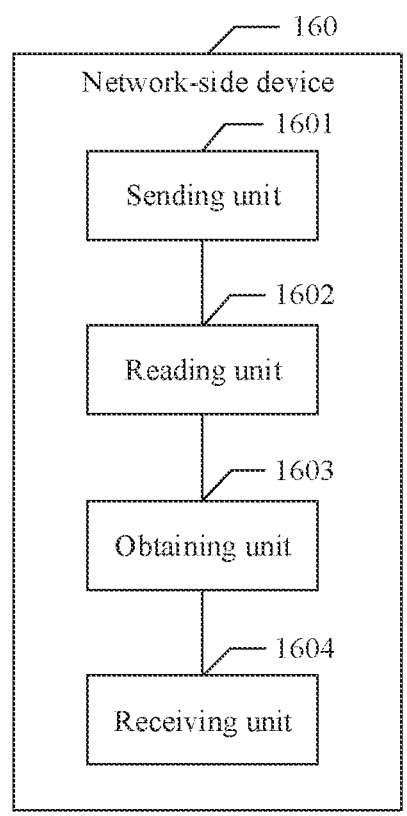
FIG. 16 is a schematic diagram of another embodiment of a network-side device according to an embodiment of this application.

As shown in FIG. 16, a sixteenth embodiment provides a network-side device 160. The network-side device 160 and corresponding units of the network-side device 160 are configured to perform the steps performed by the network-side device in the seventh embodiment. For details about execution processes and corresponding benefits, refer to the seventh embodiment for understanding. Details are not described herein again. The network-side device 160 may include:

- a sending unit 1601, configured to send indication information to a terminal device, where the indication information is used to indicate a receiving time period, and the receiving time period is after a power saving mode PSM period; and further configured to send a TA value to the terminal device;
- a reading unit 1602, configured to read location information of the terminal device from a cache;
- an obtaining unit 1603, configured to obtain the TA value based on the location information of the terminal device and/or location information of the network-side device; and
- a receiving unit 1604, configured to send data to the network-side device based on the TA value obtained by the obtaining unit 1603.

In the network-side device provided in this embodiment of this application, the sending unit 1601 sends the indication information to the terminal device before the PSM period, where the indication information may indicate the receiving time period, and the receiving time period is after the power saving mode PSM period. The reading unit 1602 may read the location information of the terminal device from the cache. Then the obtaining unit 1603 determines the current TA value based on the location information of the terminal device, and sends the TA value to the terminal device. The terminal device receives the TA value in the receiving time period. The terminal device sends the data to the network-side device based on the TA value, thereby ensuring that the network-side device is in a receiving state when the data is transmitted to the network-side device, so that the data can be properly received by the receiving unit 1604.

The data transmission method, the related device, and the system provided in the embodiments of this application are described in detail above. The principle and implementation of this application are described herein through specific examples. The description in the embodiments above is merely provided to help understand the method and main ideas of this application. In addition, persons of ordinary skill in the art can make variations and modifications in terms of the specific implementations and application scopes according to the ideas of this application. Therefore, the content of specification shall not be construed as a limitation to this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:
   receiving, by a terminal device, indication information sent by a network-side device before a power saving mode (PSM) period, wherein the indication information is used to indicate a receiving time period for the terminal device to obtain a current timing advance (TA) value, the receiving time period is after the PSM period, and the network-side device includes a satellite base station;
   obtaining, by the terminal device, a TA value in the receiving time period indicated by the received indication information; and
   sending, by the terminal device, data to the network-side device based on the TA value.

2. The method according to claim 1, wherein obtaining, by the terminal device, the TA value in the receiving time period comprises:
   obtaining, by the terminal device, the TA value in the receiving time period based on at least one of location information of the terminal device or location information of the network-side device.

3. The method according to claim 2, wherein before obtaining, by the terminal device, the TA value in the receiving time period based on the at least one of the location information of the terminal device or the location information of the network-side device, the method further comprises:
   synchronizing, by the terminal device, downlink data in the receiving time period and obtaining a downlink starting moment in the receiving time period; and
   demodulating, by the terminal device, a paging signal based on the downlink starting moment and obtaining the location information of the network-side device, wherein the paging signal is received by the terminal device from the network-side device in the receiving time period.

4. The method according to claim 2, wherein before obtaining, by the terminal device, the TA value in the receiving time period based on the at least one of the location information of the terminal device or the location information of the network-side device, the method further comprises:
   receiving, by the terminal device, the location information of the network-side device that is sent by the network-side device.

5. The method according to claim 1, wherein obtaining, by the terminal device, the TA value in the receiving time period comprises:
   receiving, by the terminal device, the TA value sent by the network-side device.

6. The method according to claim 1, wherein before receiving, by the terminal device, the indication information sent by the network-side device, the method further comprises:
   receiving, by the terminal device, handover indication information from a source network-side device, wherein the handover indication information is used to indicate the terminal device to hand over to the network-side device.

7. The method according to claim 6, wherein the handover indication information is further used to indicate the terminal device to receive indication information from the network-side device before a next PSM period and after a current PSM period.

8. A data transmission method, comprising:
   sending, by a network-side device, indication information to a terminal device before a power saving mode (PSM) period, wherein the indication information is used to indicate a receiving time period in which the terminal device obtains a current timing advance (TA) value, the receiving time period is after the PSM period, and the network-side device includes a satellite base station; and
   receiving, by the network-side device, data send by the terminal device based on the TA value.

9. The method according to claim 8, wherein after sending, by the network-side device, the indication information to the terminal device, the method further comprises:
   sending, by the network-side device, a paging signal to the terminal device, wherein the paging signal is used by the terminal device to obtain location information of the network-side device, and the location information of the network-side device is used by the terminal device to obtain a TA value.

10. The method according to claim 8, wherein after sending, by the network-side device, the indication information to the terminal device, the method further comprises:
    sending, by the network-side device, location information of the network-side device to the terminal device, wherein the location information of the network-side device is used by the terminal device to obtain a TA value.

11. The method according to claim 8, wherein after sending, by the network-side device, the indication information to the terminal device, the method further comprises:
    obtaining, by the network-side device, a TA value based on at least one of location information of the terminal device or location information of the network-side device; and
    sending, by the network-side device, the TA value to the terminal device.

12. The method according to claim 11, wherein before obtaining, by the network-side device, a TA value based on at least one of location information of the terminal device or location information of the network-side device, the method further comprises:
    determining, by the network-side device, the location information of the terminal device based on a previous TA value.

13. The method according to claim 8, wherein after sending, by the network-side device, the indication information to the terminal device, the method further comprises:
reading, by the network-side device, location information of the terminal device from a cache.

14. A terminal device, comprising:
at least one processor; and
a non-transitory computer-readable storage medium coupled to the at least one processor and storing programming instructions for execution by the at least one processor, wherein the programming instructions instruct the at least one processor to:
receive indication information sent by a network-side device before a power saving mode (PSM) period, wherein the indication information is used to indicate a receiving time period for the terminal device to obtain a current timing advance (TA) value, the receiving time period is after the PSM period, and the network-side device includes a satellite base station;
obtain a TA value in the receiving time period indicated by the received indication information; and
send data to the network-side device based on the TA value obtained.

15. The terminal device according to claim 14, wherein obtaining the TA value in the receiving time period comprises:
obtain the TA value in the receiving time period based on at least one of location information of the terminal device or location information of the network-side device.

16. The terminal device according to claim 15, wherein the programming instructions further instruct the at least one processor to:
before obtaining the TA value in the receiving time period based on the at least one of the location information of the terminal device or the location information of the network-side device:
synchronize downlink data in the receiving time period and obtain a downlink starting moment in the receiving time period; and
demodulate a paging signal based on the downlink starting moment and obtain the location information of the network-side device, wherein the paging signal is received from the network-side device in the receiving time period.

17. The terminal device according to claim 15, wherein the programming instructions further instruct the at least one processor to:
before obtaining the TA value in the receiving time period based on the at least one of the location information of the terminal device or the location information of the network-side device, receive the location information of the network-side device that is sent by the network-side device.

18. The terminal device according to claim 14, wherein the programming instructions further instruct the at least one processor to:
before receiving the indication information sent by the network-side device:
receive the TA value sent by the network-side device; and
obtain the TA value.

19. The terminal device according to claim 14, wherein the programming instructions further instruct the at least one processor to:
before receiving the indication information sent by the network-side device, receive handover indication information sent by a source network-side device, wherein the handover indication information is used to indicate the terminal device to hand over to another network-side device.

20. The terminal device according to claim 19, wherein the handover indication information is further used to indicate the terminal device to receive indication information from the another network-side device before a next PSM period and after a current PSM period.

* * * * *